US012340003B2

(12) United States Patent
Croydon et al.

(10) Patent No.: US 12,340,003 B2
(45) Date of Patent: Jun. 24, 2025

(54) LIFESTYLE CONTINUATION MODEL USING A CAPACITY UNIT ARCHITECTURE

(71) Applicant: STP Group Holdings LLC, New York, NY (US)

(72) Inventors: Henry Alistair Croydon, New York, NY (US); James Finesilver Crystal, New York, NY (US); Jonathon Henry Croydon, London (GB); Peninah Wairimu Njoki, Nairobi (KE)

(73) Assignee: STP Group Holdings LLC, New York, NY (US)

( * ) Notice: Subject to any disclaimer, the term of this patent is extended or adjusted under 35 U.S.C. 154(b) by 0 days.

(21) Appl. No.: 17/955,097

(22) Filed: Sep. 28, 2022

(65) Prior Publication Data

US 2023/0106728 A1 Apr. 6, 2023

Related U.S. Application Data

(60) Provisional application No. 63/251,904, filed on Oct. 4, 2021.

(51) Int. Cl.

| G06Q 20/06 | (2012.01) |
| G06F 3/0481 | (2022.01) |
| G06F 21/62 | (2013.01) |
| G06F 21/64 | (2013.01) |
| G06Q 40/08 | (2012.01) |
| H04L 12/14 | (2006.01) |

(52) U.S. Cl.
CPC .......... *G06F 21/645* (2013.01); *G06F 3/0481* (2013.01); *G06F 21/62* (2013.01); *G06Q 20/065* (2013.01); *G06Q 40/08* (2013.01); *H04L 12/145* (2013.01)

(58) Field of Classification Search
CPC ..................................................... G06Q 40/08
USPC .............................................................. 705/4
See application file for complete search history.

(56) References Cited

U.S. PATENT DOCUMENTS 10,565,593 B1 * 2/2020 Aabram ............... G06Q 20/145
2021/0201417 A1 7/2021 Neumann \* cited by examiner

*Primary Examiner* — Cho Yiu Kwong
(74) *Attorney, Agent, or Firm* — Foley & Lardner LLP

(57) ABSTRACT

Systems, methods, and computer-readable storage media utilized in plan generation. One system includes a plurality of data channels configured to access activity data, a network circuit, and a processing circuit communicably coupled to the plurality of data channels via the network circuit. The processing circuit can be configured to detect, from a user device of a user via a first data channel, activity data, and generate new capacity units based on the activity data. Further, the processing circuit can be configured to determine a summation of the new capacity units and un-allocated capacity units is above a threshold for a first plan, wherein the un-allocated capacity units are based on previous activity data, generate the first plan based on the summation, wherein the first plan comprises a first coverage based on the activity data or the previous activity data, and allocate the summation to the first plan.

28 Claims, 7 Drawing Sheets

LIFESTYLE CONTINUATION MODEL USING A CAPACITY UNIT ARCHITECTURE

CROSS-REFERENCE TO RELATED PATENT APPLICATIONS

The present application claims the benefit of and priority to U.S. Provisional Patent Application No. 63/251,904, filed Oct. 4, 2021, which is hereby incorporated herein by reference in its entirety.

SUMMARY

Some implementations relate to a system with a plurality of data channels configured to access activity data, a network circuit, and at least one processing circuits coupled to the plurality of data channels via the network circuit. The at least one processing circuit can be configured to detect, from a user device of a user via a first data channel of the plurality of data channels, activity data. Further, the at least one processing circuit can be configured to generate new capacity units based on the activity data. Further, the at least one processing circuit can be configured to determine a summation of the new capacity units and un-allocated capacity units is above a threshold for a first plan, wherein the un-allocated capacity units are based on previous activity data performed by the user device. Further, the at least one processing circuit can be configured to generate the first plan based on the summation of the new capacity units and the un-allocated capacity units, wherein the first plan includes a first coverage based on the activity data or the previous activity data. Further, the at least one processing circuit can be configured to allocate the summation of the new capacity units and the un-allocated capacity units to the first plan.

In some implementations, the at least one processing circuit can be configured to store a plurality of plans associated with allocated capacity unit of the user device, wherein each plan of the plurality of plans includes at least one coverage and an active period, and update allocated capacity units based on converting the summation of the new capacity units and the un-allocated capacity units into the allocated capacity units.

In various implementations, the at least one processing circuit can be configured to in response to generating the first plan, aggregate the first plan and the plurality of plans, wherein aggregating includes calculating a total coverage based on the allocated capacity units.

In some implementations, the at least one processing circuit can be configured to adjust the at least one coverage of at least one plan of the plurality of plans based on an allocation scheme set by the user.

In various implementations, the at least one processing circuit can be configured to generate a graphical user interface (GUI) comprising the plurality of plans and at least one actionable object, provide, to the user device, the GUI, receive, from the user device, an interaction with the at least one actionable object of the GUI, and update the at least one coverage of the plurality of plans.

In some implementations, the at least one processing circuit can be configured to establish a second data channel of the plurality of data channels between the processing circuit and a third-party application utilizing an application programming interface (API), generate one or more graphical user interface (GUI) objects for a third-party GUI, wherein the GUI objects include at least one actionable object, integrate the GUI objects into the third-party GUI based on executing API calls with the API, receive, via the API, an interaction with at least one plan of the plurality of plans, and update the at least one coverage or the active period of the at least one plan of the plurality of plans.

In various implementations, the at least one processing circuit can be configured to store at least one preference of the user device and select a type of plan based on the at least one preference, wherein generating the plan is further based on the type of plan.

In some implementations, the activity data is detected based on a user action, and wherein the user action is an exchange associated with the user or a usage of the user device.

In various implementations, the new capacity units are a digital asset or token issued by the processing circuit, and wherein the new capacity units are a value based on a percentage of the exchange or an amount of the exchange, and wherein the value corresponds to an exchange rate of a fiat currency or other digital currencies.

In some implementations, the at least one processing circuit can be configured to establish a third data channel of the plurality of data channels between the processing circuit and the user device utilizing an application programming interface (API), and monitor, in real-time, the third data channel comprising executing API calls with the API, wherein the API calls return environmental data.

In various implementations, the at least one processing circuit can be configured to establish a third data channel of the plurality of data channels between the processing circuit and an IoT device utilizing an application programming interface (API), wherein the IoT device is associated with the user, and monitor, in real-time, the third data channel comprising executing API calls with the API, wherein the API calls return environmental data.

In some implementations, the at least one processing circuit can be configured to determine an event satisfied at least one condition of the first plan based on the environmental data, in response to determining the event satisfied at least one condition of the first plan, automatically generate a claim for the first plan based on the first coverage and the event, automatically process the claim based on the environmental data and the event, and transmit, to the user device, the processed claim.

In various implementations, the at least one processing circuit can be configured to detect, from the user device, additional activity data, generate additional capacity units based on the additional activity data, determine the additional capacity units and the un-allocated capacity units is below the threshold for the first plan, and update the un-allocated capacity units based converting the additional capacity units into the un-allocated capacity units.

Some implementations relate to a method of plan generation, the method implemented by a processing circuit. The method includes detecting, from a user device of a user, activity data. Further, the method includes generating new capacity units based on the activity data. Further, the method includes determining a summation of the new capacity units and un-allocated capacity units is above a threshold for a first plan, wherein the un-allocated capacity units are based on previous activity data performed by the user device. Further, the method includes generating the first plan based on the summation of the new capacity units and the un-allocated capacity units, wherein the first plan includes a first coverage based on the activity data or the previous activity data. Further, the method includes allocating the summation of the new capacity units and the un-allocated capacity units to the first plan.

In some implementations, the method further includes storing a plurality of plans associated with allocated capacity unit of the user device, wherein each plan of the plurality of plans includes at least one coverage and an active period and updating allocated capacity units based on converting the summation of the new capacity units and the un-allocated capacity units into the allocated capacity units.

In various implementations, the method further includes in response to generating the first plan, aggregating the first plan and the plurality of plans, wherein aggregating includes calculating a total coverage based on the allocated capacity units.

In some implementations, the method further includes adjusting the at least one coverage of at least one plan of the plurality of plans based on an allocation scheme set by the user.

In various implementations, the method further includes generating a graphical user interface (GUI) comprising the plurality of plans and at least one actionable object, providing, to the user device, the GUI, receiving, from the user device, an interaction with the at least one actionable object of the GUI, and updating the at least one coverage of the plurality of plans.

In some implementations, the method further includes establishing a connection between the processing circuit and a third-party application utilizing an application programming interface (API), generating one or more graphical user interface (GUI) objects for a third-party GUI, wherein the GUI objects include at least one actionable object, integrating the GUI objects into the third-party GUI based on executing API calls with the API, receiving, via the API, an interaction with at least one plan of the plurality of plans, and updating the at least one coverage or the active period of the at least one plan of the plurality of plans.

In various implementations, the method further includes storing at least one preference of the user device and selecting a type of plan based on the at least one preference, wherein generating the plan is further based on the type of plan.

In some implementations, the activity data is detected based on a user action, and wherein the user action is an exchange associated with the user or a usage of the user device.

In various implementations, the new capacity units are a digital asset or token issued by the processing circuit, and wherein the new capacity units are a value based on a percentage of the exchange or an amount of the exchange, and wherein the value corresponds to an exchange rate of a fiat currency or other digital currencies.

In some implementations, the method further includes establishing a data channel between the processing circuit and the user device utilizing an application programming interface (API), and monitoring, in real-time, the data channel comprising executing API calls with the API, wherein the API calls return environmental data.

In various implementations, the method further includes establishing a data channel between the processing circuit and an IoT device utilizing an application programming interface (API), wherein the IoT device is associated with the user, and monitoring, in real-time, the data channel comprising executing API calls with the API, wherein the API calls return environmental data.

In some implementations, the method further includes determining an event satisfied at least one condition of the first plan based on the environmental data, in response to determining the event satisfied at least one condition of the first plan, automatically generating a claim for the first plan based on the first coverage and the event, automatically processing the claim based on the environmental data and the event, and transmitting, to the user device, the processed claim.

In various implementations, the method further includes detecting, from the user device, additional activity data, generating additional capacity units based on the additional activity data, determining the additional capacity units and the un-allocated capacity units is below the threshold for the first plan, and updating the un-allocated capacity units based converting the additional capacity units into the un-allocated capacity units.

Some implementations relate to a method of plan building, the method implemented by a processing circuit. The method includes detecting, from a user device of a user, activity data. Further, the method includes generating new capacity units based on the activity data. Further, the method includes determining an allocation of the new capacity units based on an allocation scheme set by the user. Further, the method includes updating a first plan based on the new capacity units, wherein the first plan comprises a first coverage, and allocating, by the processing circuit, the new capacity units to the first plan.

Some implementations relate to a system with a plurality of data channels configured to access activity data, a network circuit, and at least one processing circuits coupled to the plurality of data channels via the network circuit. The at least one processing circuit can be configured to a plurality of data channels configured to access activity data. Further, the at least one processing circuit can be configured to detect, from a user device of a user via a first data channel of the plurality of data channels, activity data. Further, the at least one processing circuit can be configured to generate additional capacity units based on the activity data. Further, the at least one processing circuit can be configured to allocate a first portion of the additional capacity units to a first plan based on a first allocation scheme set by the user, wherein the first plan includes a first coverage based on a first total amount of capacity units including the first portion of the additional capacity. Further, the at least one processing circuit can be configured to allocate a second portion of the additional capacity units to a second plan based on a second allocation scheme set by the user, wherein the second plan includes a second coverage based on a second total amount of capacity units including the second portion of the additional capacity. Further, the at least one processing circuit can be configured to establish a second data channel of the plurality of data channels between the processing circuit and the user device utilizing an application programming interface (API). Further, the at least one processing circuit can be configured to monitor, in real-time, the second data channel comprising executing API calls with the API, wherein the API calls return environmental data and update, in real-time, the first coverage of the first plan or the second coverage of the second plan based on the environmental data.

Figure 1:
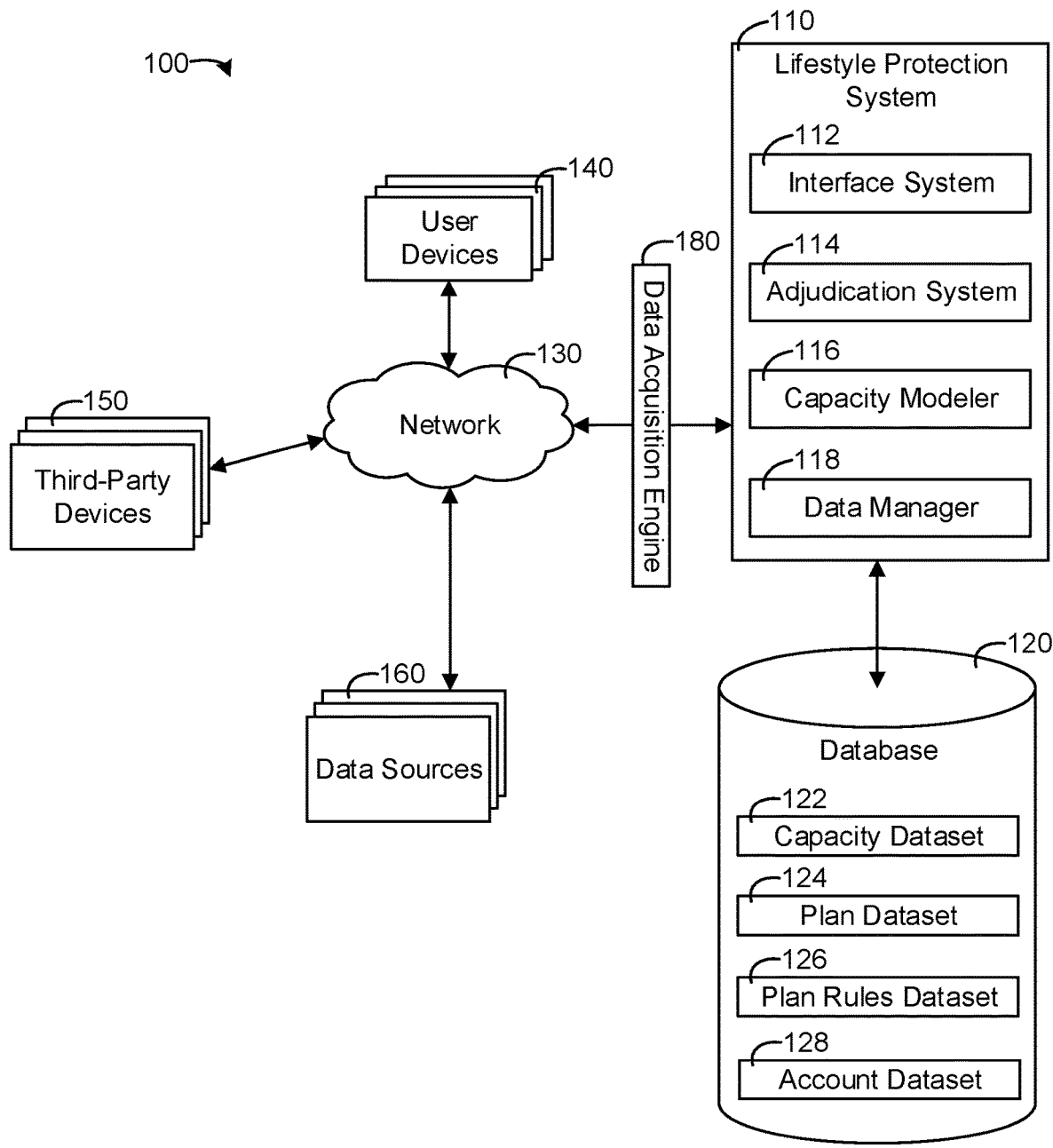
FIG. 1 is a block diagram depicting an example of a lifestyle protection system and associated environment, according to an illustrative implementation.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The present disclosure pertains to systems and methods that relate generally to the generation, aggregation, and adjudication of capacity units based on a capacity unit architecture. In some embodiments, the capacity units can be digital assets or tokens issued based on the lifestyle continuation model described herein. Issued capacity unit can be consumed by the lifestyle continuation model to generate plans such that the generated plans can be aggregated to provide lifestyle plans (e.g., daily activity coverage) to an individual (or group of individuals). In particular, capacity units can be generated based on receiving activity data (in real-time) associated with an individual (or individuals, such as a group of individuals) and capacity units can be aggregated based on the generation of a plurality of plans that can provide lifestyle coverage. In some implementations, each lifestyle plan can be a nano plan associated with a particular activity of the individual (e.g., renting a product, exchanging a product, using a service, performing a service, etc.), such that as capacity units are acquired, lifestyle plans can be generated. In various implementations, as capacity units are consumed lifestyle plans can be aggregated (stacked) or unitized. Additionally, capacity unit allocation can be customized by the individual that is provided with lifestyle plans. For example, each lifestyle plan of the aggregated lifestyle plans can include specific coverages, premiums, limits, and active periods that can each be customized by the individual. In some implementations, the systems of the capacity unit architecture can also generate and adjudicate lifestyle plan claims, in real-time, upon receiving environmental data from one or more data sources.

In some systems, plans with set coverages can be acquired by individuals at set premiums with limited options to customize the coverages. Indeed, plans with set coverages and premiums are often all or nothing (take it or leave it) options for individuals that leave many individuals unable to purchase any coverage at all. Furthermore, individuals typically cannot cover any desired daily activity or item and are unable to aggregate plans with customized coverages, premiums, and active periods. Thus, the ability to generate, aggregate, and adjudicate plans for everyday activities and items, and customize the premiums, types, percentages, and active periods based on an individual, such that an individual can be issued capacity units for customization provides individuals with enhanced and expanded plan options across everyday activities and items. This causal approach allows plan architectures to provide enhanced coverage capabilities with improved customization, while using capacity units that provides significant improvements to data collection, such that the plans can be generated based on daily activities and unitized based on preferences of the individual. Therefore, aspects of the present disclosure address problems in coverage modelling by issuing capacity units from daily activities that are utilized to improve the generation and unitization of plans across activities.

Traditionally, coverages that are underwritten are based on annual plans without individual customization. That is, if an individual desires to modify a plan (e.g., change a coverage) the individual must cancel the plan and purchase a new plan with modified coverage. Instead, this causal approach is directed to enabling individuals to manage and control their capacity (e.g., consumed by products and services at a specified rate) such that coverages and plans can be modified in real-time. Furthermore, in an age of IoT and blockchain, regular coverage providers are still stuck on legacy systems focused more on standard coverage products, with high pricing, limited delivery, and cash/carry models. That is, individuals are looking for tailored products, with seamless processes and services delivered at the tap of a button, which can also offer diversification. Thus, this causal approach brings coverage to the hands of all individuals, allowing them to pay as they go and choose coverages that best suit their needs.

Accordingly, the present disclosure is directed to systems and methods for providing customizable lifestyle plans for everyday activities and items such that individuals can customize coverage that they desire (e.g., only cover specific liability), plans they can afford (e.g., covered up to a certain dollar amount), and a specified duration they request (e.g., one day, one week, one year, etc.). In one example, an individual can have a first plan directed towards a laptop they recently purchased and a second plan for death of their parents. In this example, each plan can have a premium and limit for a specified period of time such that each individual may have a micro plan of the plurality of nano plans associated with the individual. In another example, an individual may desire to purchase medical insurance (a plan) for 3 days while they camp in a remote location but can only afford to be covered up to $200. In this example, the plan may have a premium that is $10 and a limit of $200. In particular, each nano plan can be utilized into aggregate plans (or bundles) that can be customized by the individual where an individual can adjust each plan (e.g., premium, coverage, limit, active period), such that the individual can customize the plan based on individual's schemes (sometimes referred to herein as "rules" or "preferences"). Customizing plans (e.g., via a graphical user interface) leads to an improvement in the human-machine interaction process as the individual is provided with improved control over the various characteristics of plans, such as, but not limited to, coverages, premiums, limits, active periods, etc. (also described in detail with references to FIG. 4).

Furthermore, said customization can ensure, for example, that an individual is provided plans based on their specific individual lifestyle in its entirety as activity data is received, which is a significant improvement to performance (e.g., unique plans from everyday activities) and generation of plans for individuals. Therefore, aspects of the present disclosure address problems in generating plans based on activity data by introducing a causal capacity unit architecture that issues capacity units and generates plans after a threshold of capacity units is met, such that the architecture can improve performance (e.g., additional plans can be generated based on activity data) and produce customized plans for individuals.

In various implementations, a micro plan can include an aggregate covered amount for an aggregate premium and over an active period (e.g., specified time frame) based on an individual accruing (e.g., from daily transactions) capacity units that can be used to generate one or more nano plans (where a micro plan includes a plurality of nano plans). In some implementations, once a nano plan or micro plan is generated, a lifestyle protection system can monitor various data sources and systems to determine when a payout should be initiated by automatically generating a processing a claim in real-time. For example, when an airline flight is late, a payout may be automatically deposited into an individual's bank account. In another example, when it rains, a payout may be automatically deposited into an individual's bank account. In some arrangements, the payout can be a fiat currency, digital currency, paid internally or externally, converted back into capacity units, gifted, added to a family plan or business, and so on. In particular, it should be understood that each plan can be owned or provide coverage for a group of individuals (e.g., family plan, business plan, etc.). Furthermore, each plan can have a plurality of beneficiaries customized by the individual or group.

"Capacity units" as used herein may refer to digital assets or tokens issued and/or modified by at least one processing circuit such that the capacity units are a value based on a percentage of an exchange or an amount of the exchange (e.g., issue 0.05% of the exchange in capacity units, issue $0.50 of the exchange in capacity units). In particular, capacity units can be usable units of capacity that can be consumed to create plans.

"New capacity units" as used herein may refer to digital assets or tokens issued by at least one processing circuit as activity data is detected (e.g., collected, received, and/or accessed).

"Un-allocated capacity units" as used herein may refer to digital assets or tokens issued by at least one processing circuit that are unassigned capacity units (e.g., unconsumed by plan).

"Allocated capacity units" as used herein may refer to digital assets or tokens issued by at least one processing circuit that are assigned capacity units (e.g., consumed by plan).

Referring now to FIG. 1, a block diagram depicting an example of a lifestyle protection system 110 and computing environment 100, according to an illustrative implementation. The network 130 may include a local area network (LAN), a wide area network (WAN), a telephone network, such as the Public Switched Telephone Network (PSTN), a wireless link, an intranet, the Internet, or combinations thereof. The lifestyle protection system 110 and computing environment 100 can also include at least one data processing system or processing circuit, such as lifestyle protection system 110, user devices 140, third-party devices 150, and/or multi-data sources 160. The lifestyle protection system 110 can communicate via the network 130, for example with user devices 140, third-party devices 150, and/or data sources 160.

The network 130 can enable communication between various nodes, such as the lifestyle protection system 110 and user devices 140. In some implementations, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 130 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5, Cat-6, Cat-7, etc.) and/or wireless links (e.g., radio, satellite, microwave, etc.).

The network 130 can include carrier networks for mobile communication devices, e.g., networks implementing wireless communication protocols such as the Global System for Mobile Communications (GSMC), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 130 can include short-range wireless links, e.g., via Wi-Fi, BLUETOOTH, BLE, or ZIGBEE, sometimes referred to as a personal area network (PAN) or mesh network. The network 130 may be public, private, or a combination of public and private networks. The network 130 may be any type and/or form of data network and/or communication network.

The network 130 can include a network interface controller that can manage data exchanges with devices in the network 130 (e.g., the user devices 140) via a network interface (sometimes referred to as a network interface port). The network interface controller handles the physical and data link layers of the Open Systems Interconnection (OSI) model for network communication. In some implementations, some of the network interface controller's tasks are handled by one or more processing circuits. In various implementations, the network interface controller is incorporated into the one or more processing circuits, e.g., as circuitry on the same chip.

In some implementations, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various implementations, the network interface controller implements one or more network protocols such as Ethernet. Generally, the lifestyle protection system 110 can be configured to exchange data with other computing devices via physical or wireless links through a network interface. The network interface may link directly to another device or to another device via an intermediary device, e.g., a network device such as a hub, a bridge, a switch, or a router, connecting the lifestyle protection system 110 to the network 130.

One or more user devices 140 (e.g., smartphones, tablets, computers, etc.) may be used by a user to perform various actions and/or access various types of content, some of which may be provided over a network 130 (e.g., the Internet, LAN, WAN, etc.). A "user" or "entity" used herein may refer to an individual operating user devices 140, interacting with resources or content via the user devices 140, etc. The user devices 140 may be used to send data (e.g., activity data, environmental data) to the lifestyle protection system 110 or may be used to access websites (e.g., using an internet browser), the internet (e.g., using a mobile application), media files, and/or any other types of content. In some implementations, the user devices 140 have enabled location services which can be tracked over network 130. Locations services may use GPS or other technologies to determine a location of user devices 140.

The user device 140 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). User device 140 may include an application to receive and display content and to receive user interactions with the content. For example, an application may be a web browser. Additionally, or alternatively, application may be a mobile application. User device 140 may also include an input/output circuit for communicating data over network 130 (e.g., receive and transmit to lifestyle protection system 110 and/or third-party devices 150). In particular, the input/output circuit that is structured to send and receive communications over network 130 (e.g., with the lifestyle protection system 110 and/or third-party devices 150). The input/output circuit is structured to exchange data (e.g., plan adjustments, claim data, activity data, environmental data), communications, instructions, etc. with an input/output component of the various systems and devices described herein. In one implementation, the input/output circuit includes communication circuitry for facilitating the exchange of data, values, messages, and the like between the input/output circuit and the lifestyle protection system 110 and/or third-party devices 150. In yet another implementation, the input/output circuit includes machine-readable media for facilitating the exchange of information between the input/output circuit and the lifestyle protection system 110 and/or third-party devices 150. In yet another embodiment, the input/output circuit includes any combination of hardware components, communication circuitry, and machine-readable media.

In some implementations, the input/output circuit includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit may provide an interface for the user to interact with various applications stored on the user device 140. For example, the input/output circuit includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In various implementations, input/output circuit of the user device 140 can receive user input from a user (e.g., via sensors, or any other input/output devices/ports described herein). A user input can be a plurality of inputs, including but not limited to, a gesture (e.g., a flick of user device 140, a shake of user device 140, a user-defined custom inputs (e.g., utilizing an API), biological data (e.g., stress level, heart rate, hand geometry, facial geometry, psyche, and so on), and/or behavioral data (e.g., haptic feedback, gesture, speech pattern, movement pattern (e.g., hand, food, arm, facial, iris), and so on), or combination thereof, etc. In some embodiments, one or more user inputs can be utilized to perform various actions on user device 140. For example, a user that performs an input may invoke a schemes interface for customizing one or more coverages, premiums, limits, active periods, etc.

In various implementations, input/output circuit can transmit data periodically. For example, input/output circuit may transmit data at a predefined time. As another example, input/output circuit may transmit data on an interval (e.g., every ten minutes, every ten hours, etc.). Additionally, or alternatively, input/output circuit may transmit data in response to a threshold. For example, input/output circuit may transmit data in response to receiving a threshold number of claim logs from events (e.g., ten claims, one-hundred claims, etc.). In some implementations, input/output circuit transmits data dynamically. For example, input/output circuit may transmit data in response to user device 140 communicating with another device (e.g., point-of-sale terminal). As a further example, input/output circuit may transmit activity data in response to a particular activity occurring (e.g., exchange, usage, etc.).

The application may include a collection of software development tools contained in a package (e.g., software development kit (SDK), application programming interface (API), integrated development environment (IDE), debugger, etc.). For example, application may include an application programming interface (API) configured for communication with lifestyle protection system 110, in particular, data manager 118. In another example, application may include a debugger. In yet another example, the application may be an SDK that includes an API, a debugger, and IDE, and so on. In some implementations, application includes one or more libraries having reusable functions that interface with a particular system software (e.g., iOS, Android, Linux, etc.). For example, application can automatically transmit (e.g., via a secure connection) environmental data whenever an event associated with a plan or coverage occurs. In various implementations, the application can be provided within an application (e.g., mobile application, desktop application). The application from which the lifestyle protection system 110 and/or third-party devices 150 hosts may be provided (e.g., downloaded, or via a webpage) to one or more user devices 140, via the network 130.

In an example implementation, the application can be executed (e.g., downloaded for a mobile-based application) and/or presented (e.g., via a website for a web-based application) by the user device 140 that can cause an application interface to be overlayed with a schemes interface on the user device 140. For example, the user may perform a gesture (e.g., input) and/or selection (e.g., from a selectable element or actionable object) on the user device 140 to invoke the application 144. In response, the application may request data, such as user schemes stored in database 120 (e.g., in particular plan rules dataset 126). For example, upon the request the user device 140 may present schemes associated with one or more plans and/or activities (e.g., for potential plans), and allow selection, in real-time, to make modification to one or more schemes (e.g., coverage change for a plan, premium change for a unitized plan, a limit change for a plan, an active period for a unitized plan, a change to transaction round-ups, a change to plan generation based on activity data, a change to an allocation of capacity units, etc.)

In another example implementation, the application executed by the user device 140 can cause a web browser to the display the customized plans. For example, the user may connect (e.g., via the network 130) to a website structured to host the customized plans interface (e.g., graphical user interface (GUI)). The web browser operates by receiving input of a uniform resource locator (URL) into a field from an input device (e.g., a pointing device, a keyboard, a touchscreen, mobile phone, or another form of input device). In response, the application executing the customized plan interface in the web browser may request data such as all plans associated with the user or potential plans based on activity data. The web browser may include other functionalities, such as navigational controls (e.g., backward button, forward button, home buttons). In some implementations, the customized plan interface can include both a client-side interface and a server-side interface. For example, a client-side interface can be written in one or more general purpose programming and can be executed by user device 140. The server-side interface can be written, for example, in one or more general purpose programming languages and can be executed by the lifestyle protection system 110.

In some implementations, the user devices 140 and/or third-party devices 150 have enabled location services which can be tracked over network 130. Location services may use a global positioning system (GPS) or other technologies to determine a location of the user devices 140 and/or third-party devices 150. In some implementations, location information can be used by lifestyle protection system 110 to generate plans, unitize plans, or process claims associated with plans. In some implementations, users of application may have various levels of access to perform operations and review information (e.g., restricted access, access, and review plans, submit claims, modify plans, initiate plans, authorize payment). Using a username and credentials (generally referred to herein as "an account"), a user (e.g., internal, or external) may gain access to perform various operations and review various information. Permissions associated with a user can be used to determine the data that a user has access to. That is, permissions can be used to define the access level for each user. For example, a certain interface can be generated that is only accessible to the users that have permissions to initiate plans or modify coverages. In some implementations, permissions can be user-specific and/or each user can have separate and distinct accounts.

One or more third-party devices 150 may be used by a third-party with a relationship to a user (e.g., provider, vendor, supplier, business partner, and so on) to perform various actions and/or access various types of data, some of which may be provided over network 130. A "third party" as used herein may refer to an individual operating one or more third-party devices 150, interacting with resources or data via the third-party devices 150. The third-party devices 150 may be used to electronically transmit data (e.g., third-party data) to the user devices 140, and/or lifestyle protection system 110, to access websites (e.g., using a browser), supply services, supply products, and to receive and/or transmit any other types of data. In various implementations, the application of user device 140 may be provided by third-party devices 150. For example, a rental company that rents various items may have an application that is downloadable onto a mobile phone (e.g., 140). In some implementations, the lifestyle protection system 110 can be integrated (or embedded) into a third-party application (e.g., application downloaded by user device 140) such that API calls can be executed to provide plans to users associated with the third-party of the third-party devices 150. In various implementations, integration can include communicating over network 130 with a host process (e.g., of the third-party devices) via an API and/or a user interface that is embedded into the hosts webservice or application. Once integrated, the third-party application can collect activity data and environmental data, present real-time capacity units, provide plans including one or more coverages, and/or other functionality described herein associated with the lifestyle protection system 110.

The third-party application can include, but are not limited to, delivery service applications (e.g., user receiving parcels can generate capacity), video/media providers applications (e.g., user watching videos and other streaming media can generate capacity), shopping (e.g., exchange goods and/or services can generate capacity), fitness applications (e.g., time spent and frequency of using a fitness application, attending classes, and/or working out can generate capacity), travel applications (e.g., time spent away, number of bookings, miles travelled, or amount spent can generate capacity), banking applications (e.g., any banking process from payments, loans, or savings can generate capacity), and conversion application (e.g., direct payments, spare change, or gifts can generate capacity). For example, a third party can be a travel entity for traveling, and the lifestyle protection system 110 may integrate into the travel application to provide plans for travel. In another example, a third party can be a supplier of one or more goods, and the lifestyle protection system 110 may integrate into the supplier application to provide plans for the goods. In yet another example, a third party can be a supermarket, and the lifestyle protection system 110 may integrate into the supermarket application to provide plans for home or life coverage (e.g., which may accumulate from spare change or a percentage of all exchanges on the supermarket application). In yet another example, a third party can be a payment platform (e.g., PayPal®, Zelle®), and the lifestyle protection system 110 may integrate into the payment application that can be linked to various platforms (e.g., for subscription payments, for automatic payments) such that users can set different types of coverages and establish plans associated with the links to various platforms.

The computing environment 100 can include a data acquisition engine 180. In various implementations, the lifestyle protection system 110 can be communicatively and operatively coupled to the data acquisition engine 180. The data acquisition engine 180 can include one or more processing circuits configured to execute various instructions. In various implementations, the data acquisition engine 180 can be configured to facilitate communication (e.g., via network 130) between lifestyle protection system 110, database 120, and systems and devices described herein (e.g., user devices 140, third-party devices 150, data sources 160). The facilitation of communication can be implemented as an application programming interface (API) (e.g., REST API, Web API, customized API), batch files, SDK, and/or queries. In various implementations, the data acquisition engine 180 can also be configured to control access to resources of the lifestyle protection system 110 and database 120.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

The data sources 160 can provide data to the lifestyle protection system 110. In some implementations, the data sources 160 can be structured to collect data from other devices on network 130 (e.g., user devices 140, third-party devices 150) and relay the collected data to the lifestyle protection system 110. In one example, an entity may have a server and database (e.g., proxy, enterprise resource planning (ERP) system) that stores network information associated with the user and/or third-party. In this example, the lifestyle protection system 110 may request data associated with specific data stored in the data source (e.g., data sources 160) associated with the user (e.g., activity data, environmental data). For example, in some implementations, the data sources 160 can host or otherwise support a search or discovery engine for Internet-connected devices. The search or discovery engine may provide data, via the data acquisition engine 180, to the lifestyle protection system 110. In some implementations, the data sources 160 can be scanned to provide additional activity data and/or environmental data. The additional activity data and/or environmental data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases (e.g., FBI databases, CIA databases, COVID-19 databases, No Fly List databases, terrorist databases, vulnerability database, and certificate databases), transaction data (e.g., purchases of goods and services), health data (e.g., doctor visits, prescriptions, claims) and/or any activity data and/or environmental data associated with the specific users of interest (e.g., users with plans).

The data sources 160 can provide data to the lifestyle protection system 110 based on the data acquisition engine 180 scanning the Internet (e.g., various data sources and/or data feeds) for environmental data associated with plans. That is, the data acquisition engine 180 can hold (e.g., in non-transitory memory, in cache memory, and/or in database 120) the executables for performing the scanning activities on the data sources 160. Further, the lifestyle protection system 110 can initiate the scanning operations. For example, the lifestyle protection system 110 can initiate the scanning operations by retrieving plan information or account information from database 120. As used herein, the terms "scan" and "scanning" refer to and encompass various data collection operations, which may include directly executing and/or causing to be executed any of the following operations: query(ies), search(es), web crawl(s), interface engine operations structured to enable the data acquisition engine 180 to enable an appropriate system interface to continuously or periodically receive inbound data, document search(es), dataset search(es), retrieval from internal systems of previously received data, etc. These operations can be executed on-demand and/or on a scheduled basis. In some embodiments, these operations include receiving data (e.g., activity data or environmental data) in response to requesting the data (e.g., data "pull" operations). In some embodiments, these operations include receiving data without previously requesting the data (e.g., data "push" operations). In some embodiments, the data "push" operations are supported by the data acquisition engine 180.

In some implementations, scanning occurs in real-time such that the data acquisition engine 180 continuously scans the data sources 160 for data associated with the plans, potential plans, and/or potential claims. In various implementations, scanning may occur in periodic increments such that the data acquisition engine 180 can scan the Internet for data associated with the specific user periodically (e.g., every minute, every hour, every day, every week, and any other increment of time.) In some embodiments, data acquisition engine 180 may receive feeds from various data aggregating systems that collect data associated with specific users. For example, the lifestyle protection system 110 can receive specific user data (e.g., activity data, environmental data) from the data sources 160, via the network 130 and data acquisition engine 180. The information collected by the data acquisition engine 180 may be stored as account data in the account datasets 128.

The lifestyle protection system 110 may include one or more systems (i.e., computer-readable instructions executable by a processor) and/or circuits (i.e., ASICs, Processor Memory combinations, logic circuits, etc.) configured to perform various functions of the data protection system 110. In some implementations, the systems may be or include an interface system 112, an adjudication system 114, a capacity modeler 116, and a data manager 118. It should be understood that various implementations may include more, fewer, or different systems than illustrated in FIG. 1, and all such modifications are contemplated within the scope of the present disclosure.

In general, one or more processing circuits included in the various systems described herein can include a microprocessor, an application specific integrated circuit (ASIC), a field-programmable gate array (FPGA), or combinations thereof. A memory can include electronic, optical, magnetic, or any other storage or transmission device capable of providing the processor with program instructions stored in the memory. Instructions can include executable code from any suitable computer programming language. The memory may store machine instructions that, when executed by the processing circuit, causes the processing circuit to perform one or more of the operations described herein. The memory may also store parameter data to affect presentation of one or more resources, content, etc. on the computing device. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language such as ActionScript®, C, C++, C#, Java®, JavaScript®, JSON, Perl®, HTML, HTML5, XML, Python®, and Visual Basic®.

The operations described in this disclosure can be implemented as operations performed by a data processing apparatus on data stored on one or more computer-readable storage devices or received from other sources. The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can include various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A computer program can be stored in a portion of a file that holds other programs or data (e.g., one or more scripts stored in a markup language document), in a single file dedicated to the program in question, or in multiple coordinated files (e.g., files that store one or more subsystems, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output.

In some implementations, one or more processing circuits can be configured to load instructions from the main memory (or from data storage) into cache memory. Furthermore, the one or more processing circuits can be configured to load instructions from cache memory into onboard registers and execute instructions from the onboard registers. In some implementations, instructions are encoded in and read from a read-only memory (ROM) or from a firmware memory chip (e.g., storing instructions for a Basic I/O System (BIOS)).

The one or more processing circuits can be connected to the cache memory. However, in some implementations, the cache memory can be integrated into the one or more processing circuits and/or implemented on the same circuit or chip as the one or more processing circuits. Some implementations include multiple layers or levels of cache memory, each further removed from the one or more processing circuits. Some implementations include multiple processing circuits and/or coprocessors that augment the one or more processing circuits with support for additional specialized instructions (e.g., a math coprocessor, a floating-point coprocessor, and/or a graphics coprocessor). The coprocessor can be closely connected to the one or more processing circuits. However, in some implementations, the coprocessor is integrated into the one or more processing circuits or implemented on the same circuit or chip as the one or more processing circuits. In some implementations, the coprocessor is further removed from the one or more processing circuits, e.g., connected to a bus. Details regarding processing circuits, memory, and instructions are further explained in detail with reference to FIG. 7.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

To provide for interaction with a user, implementations of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by electronically transmitting data to and receiving data from a device that is used by the user; for example, by electronically transmitting web pages to a web browser on a user's client device in response to requests received from the web browser.

Interface system 112 of lifestyle protection system 110 may be configured to generate content for displaying to users. The content can be selected from among various resources (e.g., webpages, applications, databases). Interface system 112 is also structured to provide content (e.g., via a graphical user interface (GUI)) to the user devices 140, over the network 130, for display within the resources. For example, in various implementations, a plan interface may be integrated in a user's application or provided via an Internet browser. The content from which the interface system 112 selects may be provided by the lifestyle protection system 110 via the network 130 to one or more user devices 140. In some implementations, interface system 112 may select content to be displayed on the user devices 140. In such implementations, the interface system 112 may determine content (e.g., such as plan information) to be generated and published in one or more content interfaces of resources (e.g., webpages, applications).

The interface system 112 can also be configured to query the database 120 and for information and store information in database 120. In various implementations, the database 120 includes various transitory and/or non-transitory storage media. The storage media may include magnetic storage, optical storage, flash storage, and RAM. The database 120 and/or the lifestyle protection system 110 can use various APIs to perform database functions (e.g., managing data stored in database 120). The APIs can include SQL, NoSQL, NewSQL, ODBC, and/or JDBC components.

The interface system 112 can also be configured to provide one or more customized plan interfaces (e.g., stored in database 120) to one or more computing devices (e.g., user devices 140) for presentation. That is, the provided customized plan interfaces can execute and/or be displayed at the computing devices described herein. In some implementations, the customized plan interfaces can be provided within a web browser. According to various implementations, the customized plan interfaces can be provided on-demand or as part of push notifications. In various implementations, the interface system 112 executes operations to provide the customized plan interfaces to the user devices 140, without utilizing the web browser. In various implementations, the customized plan interface can be provided within an application (e.g., mobile application, desktop application).

The lifestyle protection system 110 may be used by users to access and manage (e.g., via interface system 112) plans, allocation schemas and other information relating to an individual. In particular, the interface system 112 can be configured to generate a plurality of customized plan interfaces. The interface system 112 can generate customized user-interactive interfaces for one or more users, such as the user devices 140, based on data received from lifestyle protection system 110, any other computing device described herein, and/or any database described herein (e.g., 120). The generated interfaces can include various data (e.g., data stored in database 120) associated with one or more users including plan information (e.g., coverage, limits, premiums, active periods, type, unitized plans), account information (e.g., the amount of new capacity units, un-allocated capacity units, allocated capacity units), activities (e.g., exchanges, airtime use, data use, savings, etc.), claim information (e.g., environmental data, current claims, previous claims), plan opportunities (e.g., based on activities), etc.

In various implementations, the lifestyle protection system 110 can be implemented as separate systems or integrated within a single system (sometimes referred to as a "monitoring hub"). The lifestyle protection system 110 may be configured to communicate over the network 130 via a variety of architectures (e.g., client/server, peer-to-peer). The lifestyle protection system 110 can be configured to generate and aggregated plans based on received data (e.g., scanning various data channels, receiving various data from data channels, and/or collecting various data from data channels).

The lifestyle protection system 110 can be communicatively and operatively coupled to the database 120, which may be configured to store a variety of information relevant to activity data (e.g., from user device 140) and environmental data modelled by modeler 116. Information may be received from user devices 140, third-party devices 150, and/or data sources 160. The lifestyle protection system 110 can be configured to query database 120 for information and store information in database 120. In various implementations, the database 120 includes various transitory and/or non-transitory storage media. The storage media may include magnetic storage, optical storage, flash storage, and RAM. Database 120 and/or the lifestyle protection system 110 can use various APIs to perform database functions (i.e., managing data stored in database 120). The APIs can include, for example, SQL, NoSQL, NewSQL, ODBC, and/or JDBC.

In some implementations, a user device 140 may be queried (e.g., by data manager 118) or provide activity data to the lifestyle protection system 110, which may be stored in database 120, in particular account dataset 128. That is, each user may have an account stored in account dataset 128 that can include, but not limited to, login information, personal identifying information, account security questions, account credentials, emergency contact information, biometric information, geolocation data indicating one or more locations of a person and/or device, photographs, videos, other content, criminal records, social security numbers, passport number, payment preferences, financial information, and so on. In some implementations, capacity modeler 116 can utilize the activity data to generate capacity units, which may be stored in database 120, in particular capacity dataset 122. In addition, lifestyle protection system 110 may be configured to retrieve data via the data acquisition engine 180 (e.g., environmental data of one or more users from data sources 160, activity data of one or more users from data sources 160), and data may be stored in the account dataset 128 of database 120. In various implementations, lifestyle protection system 110 may be configured to retrieve third-party data via network 130 (e.g., activity data of a third-party device 150, environmental data of a third-party device 150) which may be stored in the account dataset 128 of database 120.

The data manager 118 can be configured to perform data collection operations, including operations to generate and/or aggregate various data structures stored in database 120, which may have been acquired as a result of scanning operations. The data manager 118 can also be configured to receive a plurality of activity data, third-party data, and environmental data. In some implementations, the data manager 118 can be configured to receive data regarding plans as a whole (e.g., stored in plan dataset 124) instead of data specific to particular plans. The received data that the data manager 118 receives can be data that lifestyle protection system 110 aggregates and/or data that the lifestyle protection system 110 receives from the data sources 160 and/or any other system described herein.

As previously described, the lifestyle protection system 110 can be configured to receive information regarding various users on the network 130 (e.g., via activity data and environmental data). Further, the multi lifestyle protection system 110 can be configured to receive and/or collect information regarding interactions that a particular user has on the network 130 (e.g., via IP traffic data). For example, an interaction may be a transaction at a particular merchant. In another example, an interaction may be a usage of a vehicle from one geographic location to a second geographic location. Further, the lifestyle protection system 110 can be configured to receive and/or collect additional environmental data. Accordingly, the received or collected information may be stored as activity data and/or environmental data in account dataset 128. In various implementations, the account dataset 128 can include user profiles.

The capacity modeler 116 implements capacity and plan generation operations of the lifestyle protection system 110. In various implementations, the capacity modeler 116 can be configured to receive a plurality of data (e.g., activity data) from a plurality of data sources (e.g., data manager 118, database 120, user devices 140, third-party devices 150, data sources 160) via one or more data channels (e.g., over network 130). Each data channel may include a network connection (e.g., wired, wireless, cloud) between the data sources and the lifestyle protection system 110. For example, the modeler 116 could receive activity data from the data manager 118 based on the data manager 118 determining capacity units should be generated. In another example, the modeler 116 could receive geolocation data from a user device (e.g., user devices 140) indicating a current location of a user associated with a plan (e.g., at the doctor's office and is enrolled in a medical plan).

Capacity modeler 116 can be configured to consume and capacity units based on allocation schemes set by users and allocation models generated by capacity modeler 116. In particular, allocation models can be generated for various plans that determine, but is not limited to, the capacity consumption rate (e.g., premium), specific coverages, limits (max payout), active periods, start date, plan clauses (terms and conditions), end date, claims requirements, etc. That is, for each capacity unit consumed. In some implementations, the allocation model may be based on various factors, including but not limited to, user factors (e.g., such as age, history, location, credit score), coverage factors (e.g., type of coverage, coverage limit, type of good or service, date, risk), capacity unit status (e.g., capacity unit level, amount of capacity units), and so on. The capacity modeler 116 can utilize one or more mathematical formulas (e.g., life tables, interest rates, actuarial present value, actuarial notation, probability density function, force of mortality, etc.) For example, plan A may have a linear capacity consumption rate of 1 capacity unit for rental coverage up to $5 and an active period of 1 year. In the following example, for each capacity unit consumed in plan A, the user may be covered up to $5 for a period of 1 year. That is, if the user consumes 20 capacity units, the user may be covered in plan A up to $100 for a period of 1 year. In another example, plan B may be based on actuarial life table that has a capacity consumption rate that can be based on a logarithmic mathematical formula. In yet another example, plan C may be based on a probability density function that has a capacity consumption rate that can be based on a differential equation mathematical formula. As shown, each plan may have a different allocation model (e.g., logarithmic, exponential, differential equation, linear algebra, actuarial equations, trigonometry, topology, signal processing, information theory, calculus, combination of mathematical formulas, and so on) based on the various factors. Accordingly, each plan may a unique allocation model with a unique calculation for determining capacity consumption rate based on specified amounts of capacity units. Accordingly, as capacity units are generated by the capacity modeler 116 based on allocation models, they can be immediately (e.g., in real-time) consumed (e.g., to stack multiple capacity units) by a plan to increase coverage, limits, and so on based on allocation scheme.

In various implementations, the capacity modeler 116 can adjust capacity unit allocations in real-time based on user modification (e.g., received from user device 140). Thus, the capacity modeler 116 can set the period, limits, and coverage options that the user can select and use capacity units to adjust. It should be understood that the capacity modeler 116 can consume capacity units as they are generated from received activity data such that a plan can be associated with an infinitely small amount of activity data (e.g., $0.01 USD, $0.0001 USD, 1 Vietnamese Dong, 1 Ugandan Shilling, 0.01 Euro, 1 megabyte of data usage, 1 airtime, 1 visit of a geolocation, and so on). In particular, plans can be built overtime (e.g., increase coverage) based on all or some activity data of an individual or group of individuals and the individuals can customize consummation in real-time as capacity units are generated.

In some implementations, the modeler 116 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 may include a request for activity data or environmental data. In some embodiments, the request submitted via the data acquisition engine 180 may include information regarding access-controlled data being requested from the user. In such cases, the request can include trust verification information sufficient to be authenticated by the user (e.g., multi-factor authentication (MFA) information, account login information, request identification number, a pin, certificate information, a private key of a public/private key pair). This information should be sufficient to allow the capacity modeler 116 to generate capacity units and generate plans.

The information regarding data requested via the data acquisition engine 180 may be any type of entity data described herein. The request may also include a deadline by which the requested data should be provided (e.g., in a response). For example, a request could be sent to an entity device (e.g., entity devices 150) for a list of utilized software utilized in a particular timeframe (e.g., currently, in the past day, in the past week, etc.) and indicating that the list should be provided within the next seven days or according to another suitable timeline. In some implementations, a request can be linked to a response with the requested data (e.g., network information, domain information, subdomain information, infrastructure, software) to enable linking of a particular request to a particular response. In some implementations (e.g., where requests comprise remediation recommendations that may comprise internal infrastructure components), the modeler 116 is structured to receive an access-controlled response from the target entity via the data acquisition engine 180. The access-controlled response may include information sufficient to be authenticated by an internal computer system. For example, in an arrangement, a remediation request may relate to a particular software-related vulnerability identified on a target system. The remediation request may comprise a link (e.g., a URL) to an internally-hosted update/patch verification tool, which the operator of the target entity may point at the instance of software installed on the operator's server to verify that remediation (e.g., installation of a recommended patch/security update) was successful. The link to the update/patch verification tool may be access-controlled and the response may comprise instructions to execute the tool and authentication information therefor.

The lifestyle protection system 110 can include an adjudication system 114. In various implementations, the adjudication system 114 can be configured to track and provide adjudication actions (e.g., claim generation and processing). In various implementations, the adjudication system 114 can determine appropriate system actions responsive to identifying claims in environmental data (e.g., received from a third-party device 150 or IoT device). The adjudication system 114 can analyze the collected environmental data to determine (e.g., generate claims for) processing claims to a user. In some implementations, analyzing collected environmental data can include querying, by the adjudication system 114, the plan rules dataset 126 for claim parameters associated with each plan. In particular, claim parameters can include one or more rules for validating a claim such that it can be processed for a specific plan. For example, if a customer has a flight delay plan, the environmental data can include flight records and user device data (e.g., activity data), and the rules can include requiring ticket information validation, flight validation, personal location, a phone. In the following example, an API may be used to assess an airline application (e.g., third-party device 150) to validate various rules. In another example, if a customer has a life plan, the environmental data can include a death certificate upload, and the rule can include death validation (e.g., query a governmental database, analyze newspapers for obituaries, etc.). In yet another example, if a customer has an accident plan, the environmental data may include user device data and third-party data, and the rules may include requiring a police report, hospital report, doctor's note, and proof of an accident (e.g., access via a first API police reports, and access via a second API hospital records and a doctor's note). In yet another example, if a customer has an income protection plan, the environmental data may include banking application data, and the rules may include requiring a bank account validation and a revenue flow analysis. As shown through the examples, once each rule is validated associated with a plan, the claim can be processed and a disbursement can be made. Also as shown, the adjudication system 114 can generate a claim with the environmental data and without user input.

Referring to claim adjudication by the adjudication system 114 generally. A customer can submit a claim via their user device based on navigating to an application or a website. In various implementations, the application or website can present to the customer what information is required to submit a claim. The customer can input information and upload various documents to submit the claim. In some arrangements, a claim may have been automatically submitted based received environmental data (e.g., from data feeds). In both arrangements (e.g., automatically, or user submission), the claim can be validated in real-time and a real-time disbursement can be made to the customer (e.g., to their digital wallet, to a third-party application etc.). In one example, Customer A can have a life plan for a year taken on Jan. 9, 2021 that expires on Jan. 8, 2022. Customer A may slowly add capacity units to cover up to $1,200. If Customer A dies on Jan. 12, 2021, they may have only earned a coverage of $500 at time of death based on the capacity units generated. In such example, the next of kin, could file a life plan claim and payout would be done automatically to the next of kin wallet based on the amount of coverage earned associated with the capacity units. In another example, Customer B can have a travel plan that covers flights (e.g., delays, lost baggage) every time they pay for a flight through their banking application. Once Customer B has a claim, they can submit a claim on the travel application associated with the third-party operating the flight. In such example, the information submitted can be auto-verified and claim payment can be made to their wallet account linked to the travel application.

Figure 2:
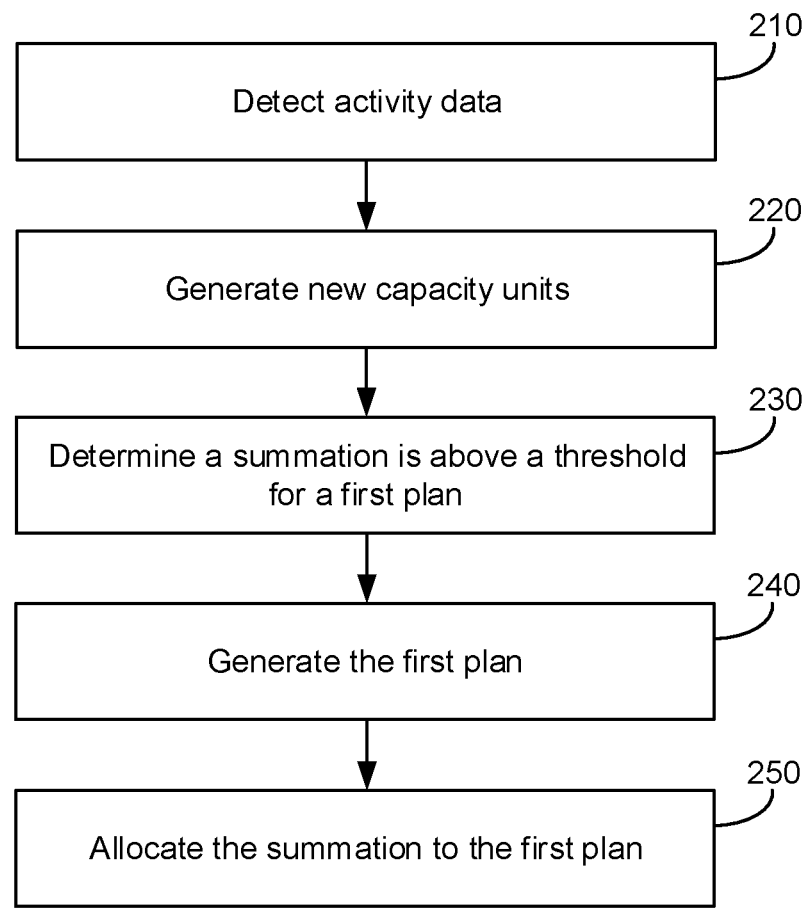
FIG. 2 is a flowchart for a method of plan generation, according to an illustrative implementation.

Referring now to FIG. 2, a flowchart for a method 200 of plan generation, according to an illustrative implementation. Lifestyle protection system 110 can be configured to perform method 200. Further, any computing device described herein can be configured to perform method 200.

In broad overview of method 200, at block 210, at least one processing circuit (e.g., data protection system 110 in FIG. 1) can detect activity data. At block 220, at least one processing circuit can generate new capacity units 220. At block 230, at least one processing circuit can determine a summation is above a threshold for a first plan. At block 240, at least one processing circuit can generate the first plan. At block 250, at least one processing circuit can allocate the summation to the first plan. Additional, fewer, or different operations may be performed depending on the particular arrangement. In various implementations, some, or all operations of method 200 may be performed by one or more processors executing on one or more computing devices, systems, or servers. In some implementations, each operation may be re-ordered, added, removed, or repeated.

In general, an individual can store a safety net in their pocket (e.g., user device 140). As described herein, method 200 enables lifestyle protections (e.g., plans) to accumulate as users interact during daily activities. In particular, as the lifestyle protections grow, coverage for various daily activities expand as time progresses and can allow individuals to access and customize lifestyle protections as they desire. Furthermore, capacity units can build from everyday activities collected via activity data (e.g., transaction, usage), which can be used, along with user schemes, to generate nano plans with various schemes (or preferences) such as, but not limited to, coverage, limits, premiums, active periods.

Referring to method 200 in more detail, at block 210, at least one processing circuit (e.g., data protection system 110 in FIG. 1) can detect, from a user device of a user via a first data channel of the plurality of data channels, activity data. For example, the processing circuit, utilizing an API, can embed into (or link-up to) a third-party system (e.g., third-party devices 150, and/or application distributed by third-party devices 150, etc.) and track and/or collect various activity data associated with activities and usage of the third-party system. In some implementations, each exchange completed on a third-party system can include a built-in capacity unit generator such that every exchange generates a fixed capacity unit amount. In some implementations, the activity data can be a user action, where the user action can be an exchange associated with the user or a usage of the user device.

At block 220, at least one processing circuit can generate new capacity units based on the activity data. In some implementations, the value of capacity units may correspond to the number of activities or usage (e.g., 1 capacity unit=1 hour of usage, 1 capacity unit=15 activities, etc.). The amount of capacity units generated can be based on one or more allocation models as described above. The user or third-party may set one or more schemes that identify how many capacity units should be issued based on a scheme (e.g., type of transaction based on credit card issuer designated merchant types, other exchange information such as, but not limited to, amount, geolocation of the third-party (e.g., merchant), geolocation of the user, time of day, item type, etc.). In some implementations, each user may set a desired scheme. For example, 1 capacity unit may be issued each time the airtime or data usage exceeds 1 gigabyte (e.g., associated with a wireless carrier). In the following example, the processing circuit could connect via a first API (e.g., unique to the carrier) with the wireless carrier system to monitor and collect usage data (e.g., activity data). In another example, 5 capacity units may be issued each time the user uses their gym card. In the following example, the processing circuit could connect via a second API (e.g., unique to the gym) with the gym system to monitor and collect gym data (e.g., activity data). In yet another example, 3 capacity units may be issued each time the user makes a payment at a grocery store. In the following example, the processing circuit could connect via a third API (e.g., unique to the grocery store) with the grocery store system to monitor and collect transaction data (e.g., activity data). Furthermore, the third-party or processing circuit (e.g., 110) may offer incentives to collect capacity units (e.g., buy six items get give six capacity units, use five gigabytes of data get five capacity units, etc.). In some arrangements, the capacity units may be owned and can be generated based on activity data received from a group of people (e.g., family plan, business plans) such that capacity units can be generated based on a plurality of individuals. For example, capacity units can be generated based on receiving activity data from all the employees of a business.

Some additional examples of activity data that can be converted in capacity units include: monitoring and collecting application data related to exercise activities that user has performed (e.g., walked 10,000 steps, burned 750 calories today (or in last week, or month), started a workout today, rode 15 miles (or km) on a bike in the last month, and so on), monitoring and collecting application data related to use of the application (e.g., used the application for less than 15 minutes, used the application for more than 30 minutes, key strokes, other biometrics). In some implementations, the capacity units can be generated based on the activity data such that capacity units can be used to encourage use of an application or use of a good or service provided by a third-party (e.g., reward going to gym or using exersive equipment (e.g., rent a bike or scouter), reward buying coffee, reward not using the application for a designated period of time, encourage or offer goods or services to a user from a third-party).

In some implementations, the new capacity units in combination with un-allocated capacity units (e.g., summation) can be used to generate one or more plans by the at least one processing circuit. For example, the processing circuit can store (e.g., in capacity dataset 122) pools of capacity units by type. In one example, new capacity units can have a pool, un-allocated capacity units can have a pool, and allocated capacity units can have a pool. However, it should be understood any number of pools or types of capacity units could be used. In some implementations, when activity data is detected, and prior to generating new capacity units, all currently pooled new capacity units can be converted (e.g., by capacity modeler 116) into un-allocated capacity units. In various implementations, when plans are generated that consume capacity units, the consumed capacity units can be converted into allocated capacity units (e.g., in capacity dataset 122). As shown, capacity units can be stacked to expand coverage, limits, and so on of plans, and plans can be stacked utilizing the capacity units to create micro plans that include a plurality of nano plans.

Accordingly, having a common unit of measurements (i.e., capacity units), the systems described herein can enable users to customize plans in real-time by adjusting capacity unit allocations, selling capacity units to other users, and/or gifting capacity units to others. For example, a charity organization may receive capacity units from community members in the form of a capacity unit gift. [Thus, the advantages of capacity units can include diversification as a user may have preference to have different capacity units allocated at the same time to multiple plans, instead of accumulating one plan at a time. In should be understand that while the new capacity units, un-allocated capacity units, allocated capacity units are labeled, each includes similar features and functionalities. In some implementation, each capacity unit may not have a special label, such that capacity units can be collected and pooled together. In some arrangements, capacity units can be shared or gifted across individuals and/or groups. For example, John Doe may have 150 generated capacity units unconsumed by a plan and can gift all or some of the capacity units to a charity such that they can consume them. Accordingly, the provided systems and methods allow individuals and groups to customize allocation and consumption of capacity units.

In some implementations, the value of capacity units may correspond to an exchange rate of a fiat currency (e.g., 1 capacity unit=$0.01 USD, 1 capacity units=$1.00 USD, etc.) or other digital currencies (e.g., 100 capacity units=0.05 Bitcoin). In some implementations, the processing circuit (e.g., lifestyle protection system 110, in particular data manager 118) may directly link a users' wallet (e.g., stored on user device 140), payment cards, accounts, etc. via an API utilizing a secure connection. "Exchange" as used herein may refer to any measurable unit such as, but not limited to, money, time, distance, data, that is agreed between the third-party and/or user and the processing circuit (e.g., 110). For example, users may configure one or more schemes stored in plan rules dataset 126 (also referred to as a "plan schemes dataset") such that a percentage (e.g., 0.1%, 0.5%, 1%, etc.) of each exchange is issued as capacity units by capacity modeler 116. In another example, at the point-of-sale (POS), the user is triggered (e.g., via an interface of the POS (e.g., 150), via a notification on their user device 140) to round up their financial exchange to put the rounded-up amount to be issued as capacity units. In some implementations, the one or more schemes can be modified in real-time by the user such that each subsequent exchange follows the one or more schemes set by the user. In various implementations, a report of issued capacity units (e.g., broken down by type such as new, un-allocated, and allocated) may be generated including one or more graphs and charts identifying one or more breakdowns by type of capacity units and total capacity units.

In some implementations, at block 220 the user can request a conversion of rewards or points (e.g., coffee reward points, air miles, gas rewards, one free drink, exercise points, rental bike usage) to capacity units that are earned through performing activities (e.g., buy a coffee, fly a certain amount of miles on a plan, buy gas, attend a gym class) with a specific third-party. In some implementations, the one or more processing circuits can automatically convert rewards or points based on a user preference or integration with a third-party (e.g., establish real-time connection using an API to determine when rewards or points are created or earned). In particular, the value of capacity units may correspond to an exchange rate of rewards or points (e.g., 1 capacity unit=5 free drinks, 1 capacity units=2000 air miles, 1 capacity unit=200 coffee reward points, 1 capacity unit=10 gym workouts, etc.). Accordingly, the one or more processing circuits can integrate (E.g., via an API of the application or website of the third-party and performing API requesting to determine rewards or points) into to various rewards or points programs of the user across their "lifestyle" (i.e., everyday activities) to improve the utilization of all activities the user performs. Additionally, the full-integration improves interoperability across rewards and points from third-parties. For example, 10 new capacity units can be generated from a combination of rewards, points, activity data, environmental data, and third-party data.

At block 230, at least one processing circuit can determine a summation of the new capacity units and un-allocated capacity units is above (or on and above) a threshold for a first plan, wherein the un-allocated capacity units are based on previous activity data performed by the user device. In some implementations, the processing circuit can store a plurality of plans associated with allocated capacity units of the user device. In particular, each plan of the plurality of plans can include, but is not limited to, at least one coverage, a premium, and an active period. The plans can be stored in a dataset (e.g., 124) of a database (e.g., 120). In various implementations, the threshold can be set by a user or identified by one or more processing circuits (e.g., capacity modeler 116) based on analyzing the entity data. Thresholds can be based on inequalities (e.g., greater then, less then, between), Boolean algebra (e.g., and, or, nor), binary logic (e.g., truth table, tautologies, and logical equivalences), and/or equations (e.g., quadratic, linear, radical, exponential, rational). For example, the user may set a threshold of 0 such that whenever new capacity units are generated, they are above the threshold and can be consumed to generate a new plan or consumed by a current plan. In another example, the user may set a threshold of 10 such that whenever the summation of the new capacity units and un-allocated capacity units is greater than 10, the capacity units can be consumed to generate a new plan or consumed by a current plan. In some implementations, new capacity units may be automatically allocated to a plan already generated and/or used to generate a new plan. Accordingly, in some implementations, the un-allocated capacity units may be zero such that each time new capacity units are generated they are automatically allocated based on an allocation scheme.

In various implementations, the allocated capacity units can be generated based on converting the summation of the new capacity units and the un-allocated capacity units into the allocated capacity units. In some implementations, in response to generating the first plan, at least one processing circuit can aggregate (or stack) the first plan and the plurality of plans, where aggregating can include calculating a total coverage and a total premium based on the allocated capacity units. Alternatively, the at least one processing circuit can determine the summation of the new capacity units and the un-allocated capacity units is below (or on or below) the threshold for the first plan. In that following alternative, the at least one processing circuit can update the un-allocated capacity units based on converting the new capacity units into un-allocated capacity units.

At block 240, at least one processing circuit (e.g., in particular, capacity modeler 116) can generate the first plan based on the summation of the new capacity units and the un-allocated capacity units, wherein the first plan includes a first coverage based on the activity data or the previous activity data. In some implementations, a plan can be generated based on capacity units generated from daily activities and usage associated with a third-party system (e.g., 150). By issuing out the capacity units, the systems described herein provides users the ability to customize plans based on one or more schemes and can modify the plans in real-time. Generally, users are issued capacity linked to activity data (e.g., payments or airtime use or data use, savings, or any regular activity that represents a value). Further, the activity data can be converted into a nano payment (e.g., capacity units) to the systems described herein to provide a capacity contribution to the user. Alternatively, based on an allocation scheme, the new capacity units can be automatically consumed by a current plan without generating a new plan. That is, in some implementations, instead of using a threshold, Block 230 can be skipped and new capacity units can be automatically consumed by a plan based on an allocation scheme of the user.

In various implementations, a plan can be generated based on capacity units generated from exchanges (e.g., a percentage of the exchange, spare change, etc.). Capacity units can be earned from activity data and the rate at which capacity units are issued depends on one or more schemes of the user (described in detail with reference to block 210). The one or more schemes can be stored in plan rules dataset 126. In some implementations, the at least one processing circuit can select a type of plan based on the at least one scheme, and in response generating the plan based on the type of plan selected.

In some implementation, each generated nano plan can include nano limits and utilize new and/or un-allocated capacity units. Additionally, a plurality of nano plans can be unitized to generate micro plans (or master plans) that can provide coverage across everyday activities such as, but not limited to, purchased products and/or purchased services. That is, the processing circuit generating nano plans can consume (or allocate) the capacity units though the rating system managed by the user device. As described above, the processing circuit can consume capacity on demand and in real-time by the user. In particular, the multi-plan integration can enable users to modify capacity allocation (e.g., parameters) and re-consume capacity on demand and in real-time. In various implementations, the user (e.g., via a GUI on their user device) can customizer one or more plan parameters that can be updated at the user's desire. At block 240, instead of generating a first plan, the processing circuit can consume capacity units to a current plan based on an allocation scheme of a user. For example, the user may have life insurance plan that has a goal of 100 (e.g., allocation scheme) capacity units and as new activity data generates new capacity units, the new capacity units can be consumed by the life insurance plan until it reaches the goal of 100 capacity units. In the following example, once the goal is reached a new plan may be created as described above. At any time (or in real-time), the user can modify the allocation schemes of plans, readjust capacity unit allocations to plans, and/or cancel plans. In some arrangements, the plans may be generated for a group of people (e.g., family plan, business plans) such that a plan can be customized by a plurality of individuals. For example, capacity units and generated nano plan can be owned by a family (e.g., two adults, five kids, and one grandparents) such that each family member (or specific family members with customization access) can modify plans and adjust capacity units in real-time.

At block 250, at least one processing circuit can allocate the summation of the new capacity units and the un-allocated capacity units to the first plan. In particular, the at least one processing circuit can consume the summation of the capacity units into the first plan. The allocation update can include updating the capacity dataset 122. For example, the allocation can include converting the new capacity units pool and un-allocated capacity units pool into the allocated capacity units pool. In various implementations, each plan may have an allocation of allocated capacity units that is indicative of the various schemes of the plan including, but not limited to, coverage, premium, active period, etc.

Additionally, at least one processing circuit can adjust at least one coverage or the premium of at least one plan of the plurality of plans based on an allocation scheme set by the user. Allocation schemes can be configured by users that can define how capacity units should be allocated to each plan. In some implementations, the allocation schemes can be based on credit card issuer designated merchant type (e.g., gas, bakeries, home supply warehouses, sporting goods stores). In various implementations, the allocation scheme can be based on type of activity (e.g., usage, exchange, savings, etc.). In some implementations, the allocation scheme can be based on method of exchange (e.g., online, in-person, blockchain, etc.). Accordingly, the allocation scheme can include various rules for issuing capacity units and generating plans.

In various implementations, at least one processing circuit can store a plurality of plans and update allocated capacity units. That is, the at least one processing circuit can store a plurality of plans associated with allocated capacity unit of the user device such that each plan of the plurality of plans includes at least one coverage, a premium, and an active period. Furthermore, the at least one processing circuit can update allocated capacity units based on converting the summation of the new capacity units and the un-allocated capacity units into the allocated capacity units.

In some implementations, in response to generating the first plan, the at least one processing circuit can aggregate (or stack) the first plan and the plurality of plans, where aggregating includes calculating a total coverage and a total premium based on the allocated capacity units. That is, the at least one processing circuit can unitize a plurality of plans such that a user can customize and receive protection that is unitized across daily activities. Additionally, in response to unitizing a plurality of plans, the user or processing circuit can adjust the at least one coverage or the premium of at least one plan of the plurality of plans based on an allocation scheme set by the user. For example, the adjustment can increase a coverage because the total consumer capacity units of the unitized plans increased (e.g., reducing risk on the protection).

In various implementations, at least one processing circuit can provide a graphical user interface to an individual for customizing plans. In particular, the at least one processing circuit can generate a graphical user interface (GUI) including the plurality of plans and at least one actionable object and provide the GUI to a user device for display. In response to receiving an interaction with the at least one actionable object of the GUI (e.g., slider, selection of a button, click), the at least one processing circuit can update at least one coverage, premium, or active period of the plurality of plans. In some implementations, the GUI can also include goals set by the user and currently allocated (e.g., stored) and un-allocated (e.g., temporary) capacity units. For example, the user may set a goal to consume 100 capacity units on plan B by December.

In some implementations, at least one processing circuit can establish a second data channel with a third-party application (e.g., distributed by third-party devices 150) to embed one or more functionalities of the system described herein. In particular, the at least one processing circuit can establish a second data channel of the plurality of data channels between the processing circuit and a third-party application utilizing an application programming interface (API). Once a second data channel is established, the at least one processing circuit can generate one or more graphical user interface (GUI) objects for a third-party GUI (e.g., including actionable objects) and integrate the GUI objects into the third-party GUI based on executing API calls with the API. In response to receiving an interaction with at least one plan of the plurality of plans on the third-party application, the at least one processing circuit can update at least one coverage, premium, or active period of the plurality of plans. Alternatively, activity data can be detected from the third-party application (e.g., exchange, usage) and capacity units can be generated and consumed based on the detected activity data (described in detail with reference to blocks 210-240).

In various implementations, a claim can be automatically generated based on determining an event was satisfied with at least one condition of a plan. In one example, the at least one processing circuit can establish a third data channel of the plurality of data channels between the processing circuit and the user device utilizing an application programming interface (API) and monitor, in real-time, the third data channel comprising executing API calls with the API, wherein the API calls return environmental data. In another example, the at least one processing circuit can establish a fourth data channel of the plurality of data channels between the processing circuit and an IoT device (e.g., smart TV, smart device, camera, any device embedded with a sensor and configured to exchange data) utilizing an application programming interface (API) and monitor, in real-time, the fourth data channel comprising executing API calls with the API, wherein the API calls return environmental data. In the following example, the IoT device may be a water sensor configured to detect the amount of water (e.g., environmental data) through a pipe. Alternatively, in the following example, the IoT device may be a smart security system configured to detect and identify individuals (e.g., environmental data). Furthermore, the claim can be generated based on a combination of the data from the third and fourth data channels.

Additionally, the at least one processing circuit (e.g., in particular adjudication system 114) can determine an event satisfied at least one condition of the first plan based on the environmental data and in response to determining the event satisfied at least one condition of the first plan, automatically generate a claim for the first plan based on the first coverage and the event. In some implementations, the generated claim can be automatically processed based on the environmental data and the event, and the processed claim can be transmitted to the user device. In various implementations, the at least one processing circuit can detect, from the user device, additional activity data and generate additional capacity units based on the additional activity data. As used herein, the additional capacity can be new capacity units. In some implementations, the stored new capacity units may be converted to un-allocated capacity units as additional activity data is received and prior to generating additional capacity units (e.g., new capacity units).

Furthermore, the at least one processing circuit can be configured to build plans as capacity units are generated. For example, in broad overview of another method, at least one processing circuit (e.g., data protection system 110 in FIG. 1) can detect, from a user device of a user, activity data. Further, the at least one processing circuit can generate new capacity units based on the activity data. Further, the at least one processing circuit can determine an allocation of the new capacity units based on an allocation scheme set by the user. Further, the at least one processing circuit can update a first plan based on the new capacity units, wherein the first plan comprises a first coverage, and allocate the new capacity units to the first plan. As shown, the at least one processing circuit can stack capacity units to one or more plans as they are generated in real-time. In some arrangements, as capacity units are stacked, the first plan can increase coverages, limits, and so on. Additional, fewer, or different operations may be performed depending on the particular arrangement. In various implementations, some, or all operations of building plans as capacity units are generated may be performed by one or more processors executing on one or more computing devices, systems, or servers. In some implementations, each operation may be re-ordered, added, removed, or repeated.

Moreover, the at least one processing circuit can be configured to build multiple plans as capacity units are generated. For example, in broad overview of another method, at least one processing circuit (e.g., data protection system 110 in FIG. 1) can detect, from a user device of a user via a first data channel of the plurality of data channels, activity data. Further, the at least one processing circuit can generate additional capacity units based on the activity data. Further, the at least one processing circuit can allocate a first portion of the additional capacity units to a first plan based on a first allocation scheme set by the user, wherein the first plan includes a first coverage based on a first total amount of capacity units including the first portion of the additional capacity. Further, the at least one processing circuit can allocate a second portion of the additional capacity units to a second plan based on a second allocation scheme set by the user, wherein the second plan includes a second coverage based on a second total amount of capacity units including the second portion of the additional capacity. Further, the at least one processing circuit can establish a second data channel of the plurality of data channels between the processing circuit and the user device utilizing an application programming interface (API). Further, the at least one processing circuit can monitor, in real-time, the second data channel comprising executing API calls with the API, wherein the API calls return environmental data, update, in real-time, the first coverage of the first plan or the second coverage of the second plan based on the environmental data. As shown, the at least one processing circuit can stack capacity units to a plurality of plans as they are generated in real-time. In some arrangements, as capacity units are stacked, the first plan and the second plan can increase coverages, limits, and so on. Additional, fewer, or different operations may be performed depending on the particular arrangement. In various implementations, some, or all operations of build multiple plans as capacity units are generated may be performed by one or more processors executing on one or more computing devices, systems, or servers. In some implementations, each operation may be re-ordered, added, removed, or repeated.

Additionally, the at least one processing circuit (e.g., in particular adjudication system 114) can receive a cash-out request by a user of capacity units. The cash-out request can designate an amount of capacity units to cash-out (e.g., below the total allocated and un-allocated capacity units of the users) and an exchange form to receive the cash-out. In response to receiving a cash-out request, the at least one processing circuit can convert un-allocated and/or allocated capacity units into the designated exchange form (e.g., fiat currency, points, rewards, cryptocurrency, stock, equities, bonds, gym class, free coffee, pay taxes, etc.). For example, upon receiving a cash-out request for 10 capacity units to Bitcoin (or any other cryptocurrency), the one or more processing circuits can determine an exchange rate (e.g., 15000 capacity unit per 1 Bitcoin), purchase or transact for the Bitcoin using capacity units based on the exchange rate (e.g., 10/15000=0.000666 Bitcoin) based on accessing or communicating with a cryptocurrency ledger and receiving a public and private key pair for the amount of Bitcoin. In the following example, the one or more processing circuits can destroy the amount of capacity units converted and send the private key to the user or update a digital wallet of the user device to include the private key (e.g., using an API request). In another example, upon receiving a cash-out request for 200 capacity units to free or discounted gym classes (e.g., cycling class), the one or more processing circuits can determine an exchange rate (e.g., 75 capacity unit per 1 gym class), purchase or transact for the gym classes using the capacity units based on the exchange rate (e.g., 200/75=2.5 gym classes) based on accessing or communicating with a gym website or application and receiving a gym credit. In the following example, the one or more processing circuits can destroy the amount of capacity units converted and send the gym credit to the user or update a gym application (e.g., ClassPass™ CycleBar™) of the user device to include the free or discounted gym classes. In another example, upon receiving a cash-out request for 6000 capacity units to pay property taxes, the one or more processing circuits can determine an exchange rate (e.g., 3 capacity unit per $1 assessed value), transact with the property tax assessor computing system using the capacity units based on the exchange rate (e.g., 6000/3=$2000 assessed value) based on accessing or communicating with a tax assessor website or application and receiving a payment notice. In the following example, the one or more processing circuits can destroy the amount of capacity units converted and send a notification to the user or lender indicating all or a portion of the property taxes were paid.

Figure 3:
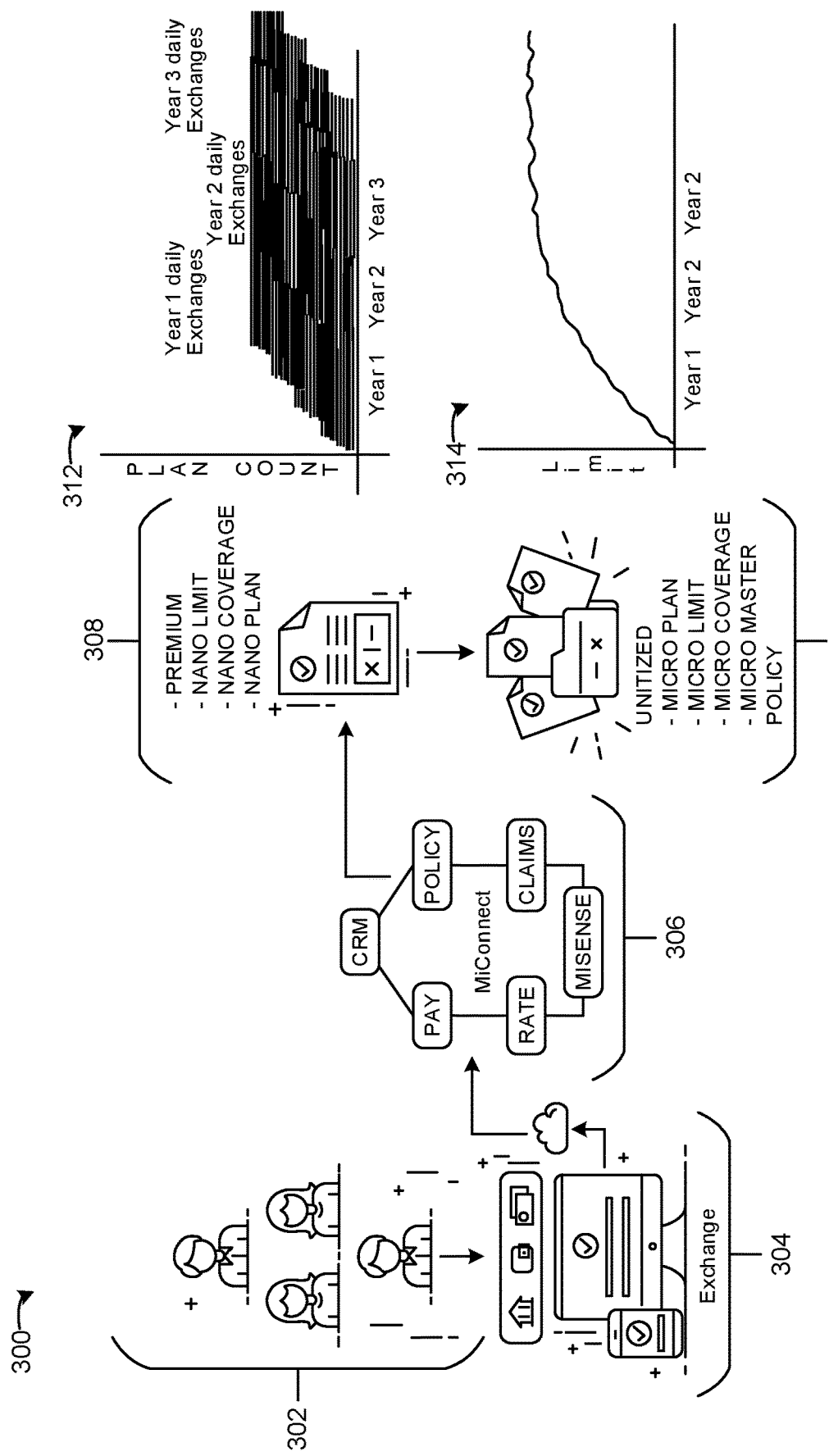
FIG. 3 is an example illustration of plan generation, according to an illustrative implementation.

Referring now to FIG. 3, an example illustration of a capacity unit architecture 300 of FIG. 1, according to an illustrative implementation. The capacity unit architecture 300 is shown to include an interaction layer 302 (hereafter "layer 302"), a data manger layer 304 (hereafter "layer 304"), a capacity modeler layer 306 (hereafter "layer 306"), a plan generation layer 308 (hereafter "layer 308"), and a plan unitizer layer 310 (hereafter "layer 310"). Additionally, as shown, graphs 312 and 314 can include various metrics of the plans generated and unitized in layer 310.

At layer 302, activity data can be generated and accumulated by a user device (e.g., 140) as the user performs activities and interactions. The processing circuits of the user device can communicate the activity data with the data manager 118 via an API utilizing a data channel. Alternatively, the data manager 118 may detect activity data was generated by the user device and access the user device to collect the activity data. In some implementations, the activity data can be collected, received, or accessed by the data manager 118. At layer 304, a data manager 118 can classify various activity data (e.g., based on schemes set by a user) based on schemes (sometimes referred to herein as allocation schemes). The data manager 118 can query and store the activity data in account dataset 128 and/or communicate the classified data to capacity modeler 116. In some implementations, the activity data can be analyzed to determine usage, type of exchange, etc. such that a scheme can be selected. At layer 306 and 308, a capacity modeler 116 can identify and generate one or more plans with one or more schemes based on data stored in the plan dataset 124 and plan rules dataset 126. The generation of new plans can also include consuming capacity units stored in capacity dataset 122. At layer 310, the capacity modeler 116 can unitize a plurality of plans to generate master plans. In some implementations, the generated master plan can have unique schemes such as premiums, coverages, active periods.

Additionally, as shown, the capacity graph 312 includes active periods of plans based on consumed capacity. Each plan can be layered (or stacked) to build the user a master plan (or micro plan). In particular, the layering is dynamic and builds as activity data is detected and capacity units are consumed by plans. For example, as capacity units are generated, plans can consume additional capacity units thereby increases coverage, limits, etc. Also as shown, capacity graph 314 includes the total consumed capacity units over time. In particular, the user can build master plan capacity (e.g., consumed capacity units) such that plans can be unitized to provide a user with protection for daily activities.

Figure 4:
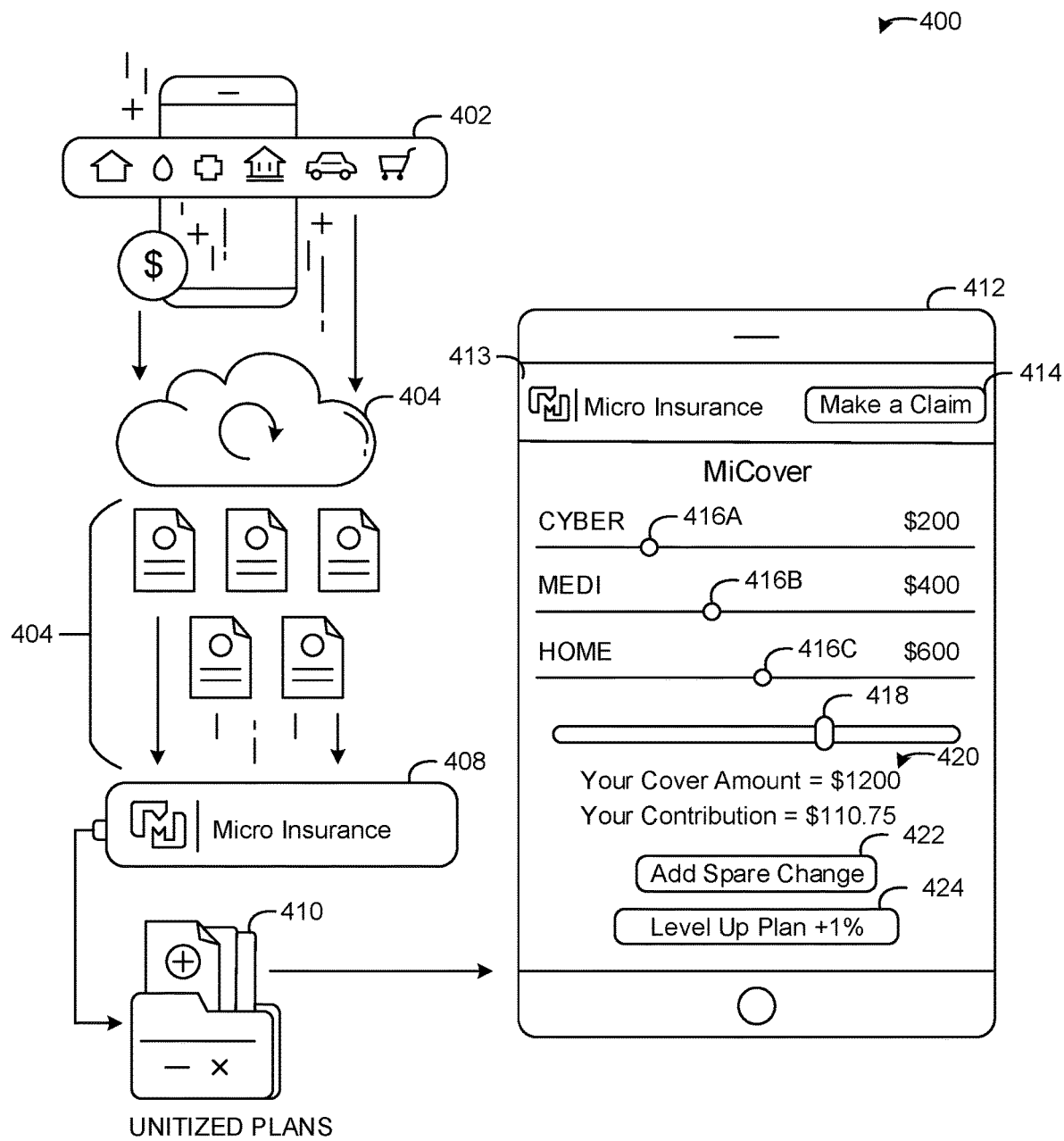
FIG. 4 is an example illustration depicting a first application interface, according to an illustrative implementation.

Referring now to FIG. 4, an example illustration depicting a first application interface 413, according to an illustrative implementation. In some implementations, a processing circuit (e.g., interface system 112 in FIG. 1) can generate a graphical user interface (GUI) including the plurality of plans and at least one actionable object. Further, the processing circuit can provide, to the user device, the GUI. Further, the processing circuit receive, from the user device, an interaction with at least one actionable object of the GUI. Further, the processing circuit can update at least one coverage or the premium of the plurality of plans (e.g., stored in plan dataset 124). In various implementations, activity data 402 can be sent over a network (e.g., 130) to the lifestyle protection system 404 (e.g., lifestyle protection system 110). The lifestyle protection system 404 can generate one or more plans 404 and store the plans in database 408 (e.g., database 120, in particular plan dataset 124). In some implementations, the plans can be unitized by modeler 410 (e.g., modeler 116) with unitized coverage, limits, premiums, etc. The unitized plans can be provided (e.g., by interface system 112) to display device 412 (e.g., user device 140). Further, the unitized plans can be provided in a graphical user interface (GUI).

As shown in the FIG. 4, the first application interface 413 can include actionable objects (e.g., 414, 416A-C, 418, 422, 424) that can be interacted with (e.g., selected, clicked) depicting plan adjustments (e.g., limits, coverage, premiums, etc.) on display device 412 (e.g., user device 140). The user (e.g., operating user device 140) can interact with one or more of the actionable objects to modify plans. For example, a user may select and slide actionable object 416A to increase the coverage amount to $300 (shown in information object 318) and select and slide actionable object 416B to decrease the coverage amount to $300. In another example, a player may select actionable object 414 to begin processing a claim. In yet another example, a player may select actionable object 424 to increase (or "level up") premiums on one or more plans. In some implementations, it should be understood that the presented actionable items may be for a plurality of plans and the depictions of the first application interface is purely example plans, and other configurations including other content, such as plans and adjustment opportunities for various other activities are possible.

Additionally, the first application interface 413 can include information objects (e.g., 720) that can be configured to provide content via display device 412. For example, the current coverage amount and contribution is shown in the current amount fields 420. It should be understood that the labels, elements, objects, locations, and depictions of the first application interface 413 are purely example interface elements, and other configurations including other content are possible. Furthermore, first application interface 413 can present various interactive objects and elements to enhance user experience by motivating and engaging users (e.g., gamification). For example, the first application interface 413 can present levels based on capacity units and provide level-up notifications and rewards to encouraged capacity unit generation based on activity data of the user. In another example, the first application interface 413 can provide discounts to purchase capacity units for a specified period of time.

Figure 5:
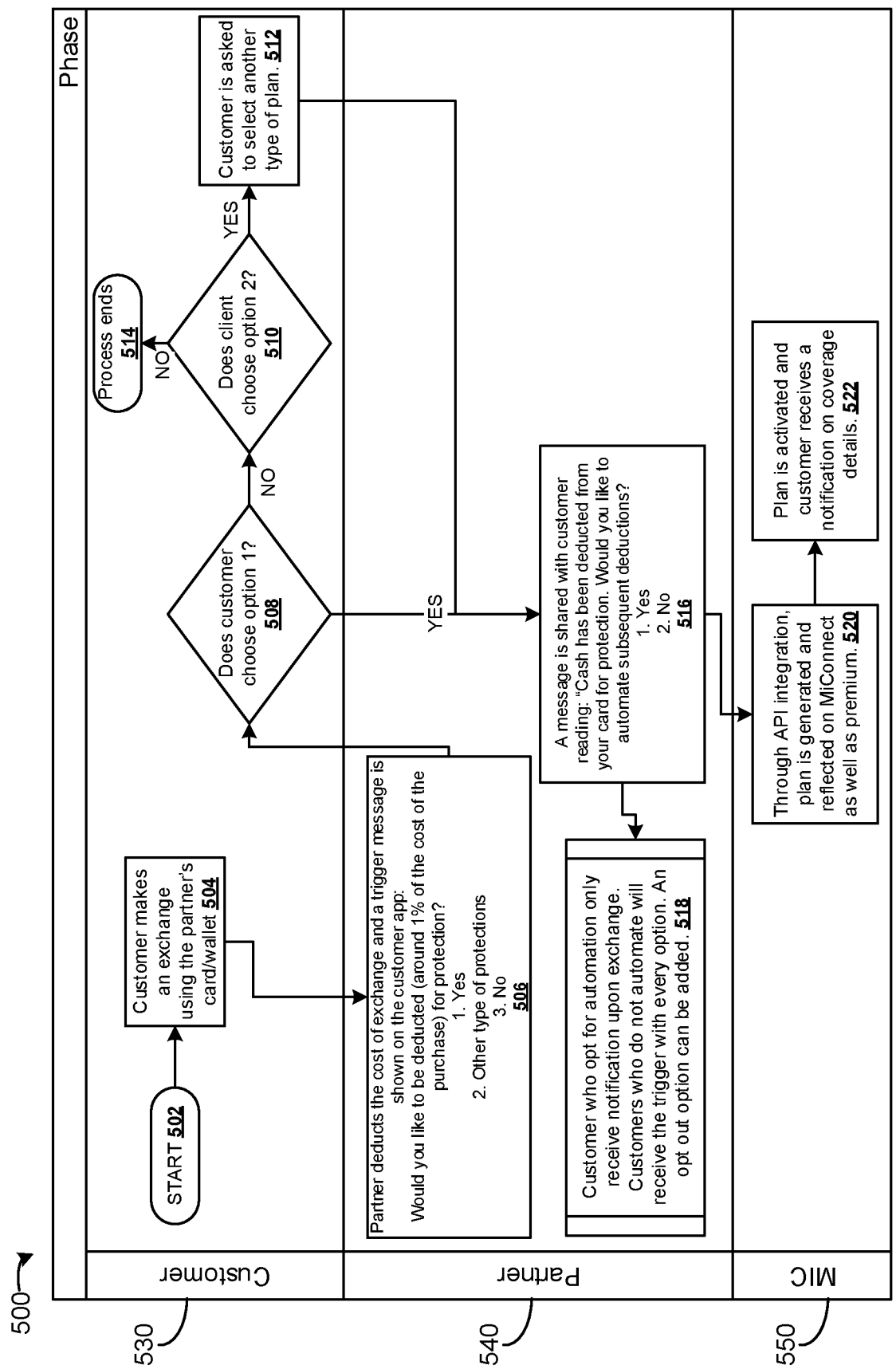
FIG. 5 is an example flowchart for plan generation, according to an illustrative implementation.

Referring now to FIG. 5, an example flowchart 500 for plan generation, according to an illustrative implementation. Lifestyle protection system 110 can be configured to perform plan generation. Further, any computing device described herein can be configured to perform plan generation. As shown, there can be a customer perspective 530, partner perspective 540, and lifestyle protection system perspective 550. In the example flowchart 500, the customer can start (STEP 502) by performing an exchange using a partner's card and/or wallet (e.g., third-party) (STEP 504). Next, the partner (e.g., a third-party) can deduct the cost of the exchange and generate a message (e.g., GUI interface) to display on a customer device (e.g., 140) of the customer performing the exchange (STEP 506). The message can include option to deduct a percentage of the exchange for protection. If the customer selects "yes" to protect the exchange (STEP 508), a message can be provided to the customer device indicating the value has been deducted for protection and requesting from the customer if they would like to automate subsequent deductions (STEP 516). If the customer selects "yes" to automate subsequent deductions, the partner can opt the customer in for automation (STEP 518). Additionally, the data protection system (e.g., 110) can generate a plan (STEP 520) based on the user selecting "yes" (STEP 508). Furthermore, the plan can be activated and sent to the customer device with a message indicating the coverage details (STEP 522). If the customer selects "other type of protection" (STEP 510), a message can be provided to the customer device indicating to select a type of plan to generate (STEP 512) and once selected can complete the steps described above with reference to STEPS 516-522. In the customer does not select option 1 or 2 (STEP 506), the process ends (STEP 514).

Figure 6:
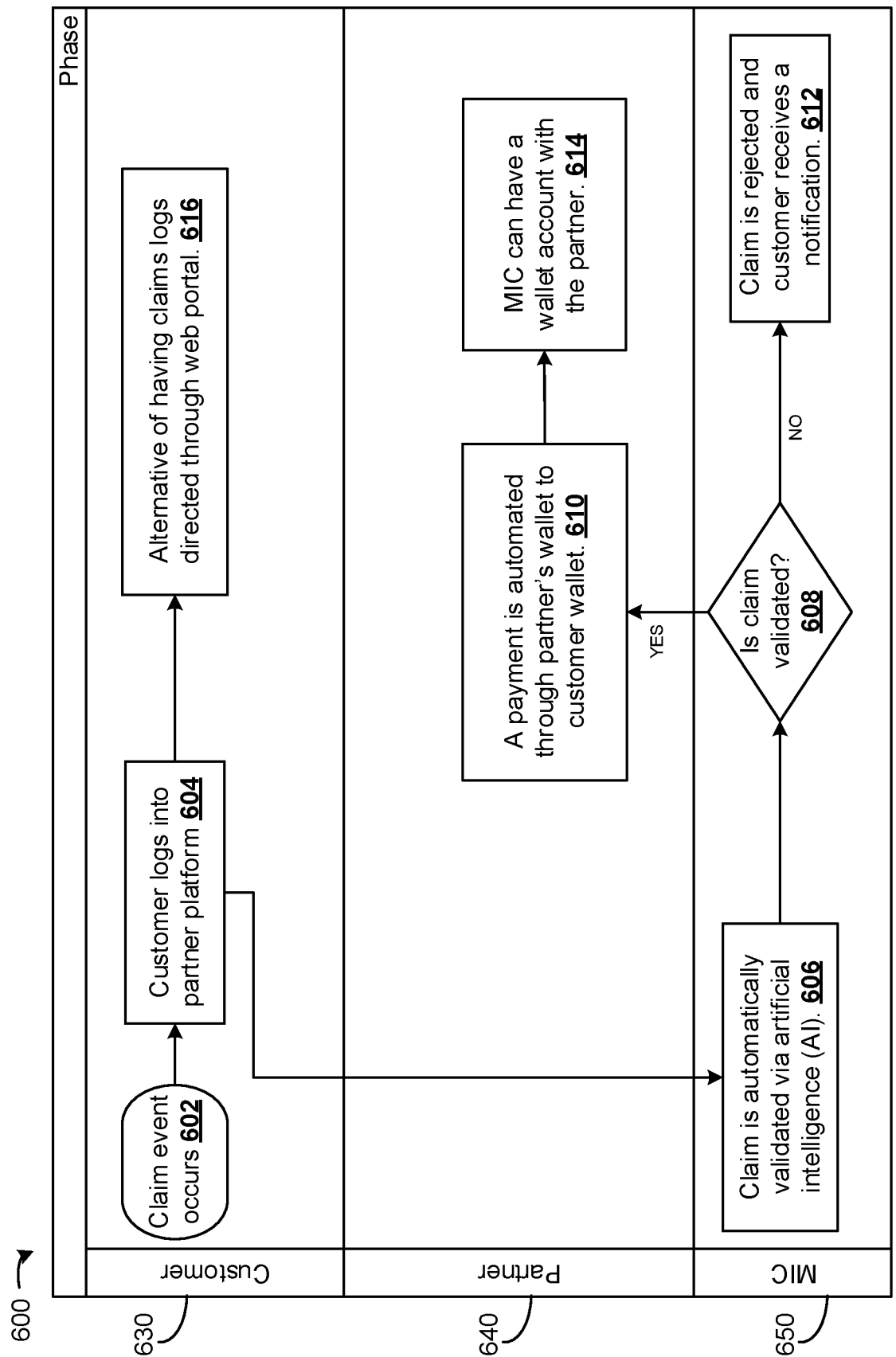
FIG. 6 is an example flowchart for claim generation, according to an illustrative implementation.

Referring now to FIG. 6, an example flowchart 600 for claim generation, according to an illustrative implementation. Lifestyle protection system 110 can be configured to perform claim generation. Further, any computing device described herein can be configured to perform claim generation. As shown, there can be a customer perspective 630, partner perspective 640, and lifestyle protection system perspective 650. In the example flowchart 600, a claim event can occur (STEP 602). An event can be determined based on received environmental data (e.g., from user device, data sources, third-party devices, etc.). The customer can log into a partner platform (e.g., third-party device) (STEP 604). Next, the claim can be automatically validated via artificial intelligence (AI) (STEP 606). Alternatively, the claim can be logged for processing (STEP 616). That is, a claim can be automatically processing after the claim is analyzed and determined to satisfy one or more requirements (e.g., document requirements, authorization requirements, other information). In the automatic validation route, if the claim is validated (STEP 608) a payment can be automatically sent to a wallet (e.g., third-party or customer wallet) (STEP 610). In some implementations, the lifestyle protection system 110 can have a wallet account associated with the third-party or customer wallet (STEP 614). If the claim is rejected the customer may be provided a notification (STEP 612).

In various implementations, previously processed claims can be used to train a machine-learning model. That is, predictions regarding whether to process a claim (e.g., payout) could be based on an artificial intelligence (AI) or a machine-learning model. For example, a first machine-learning model may be trained to identify particular environmental data and output a prediction (e.g., payout or reject). Accordingly, processing a claim may include utilizing a machine learning algorithm (e.g., a neural network, convolutional neural network, recurrent neural network, linear regression model, and sparse vector machine).

Figure 7:
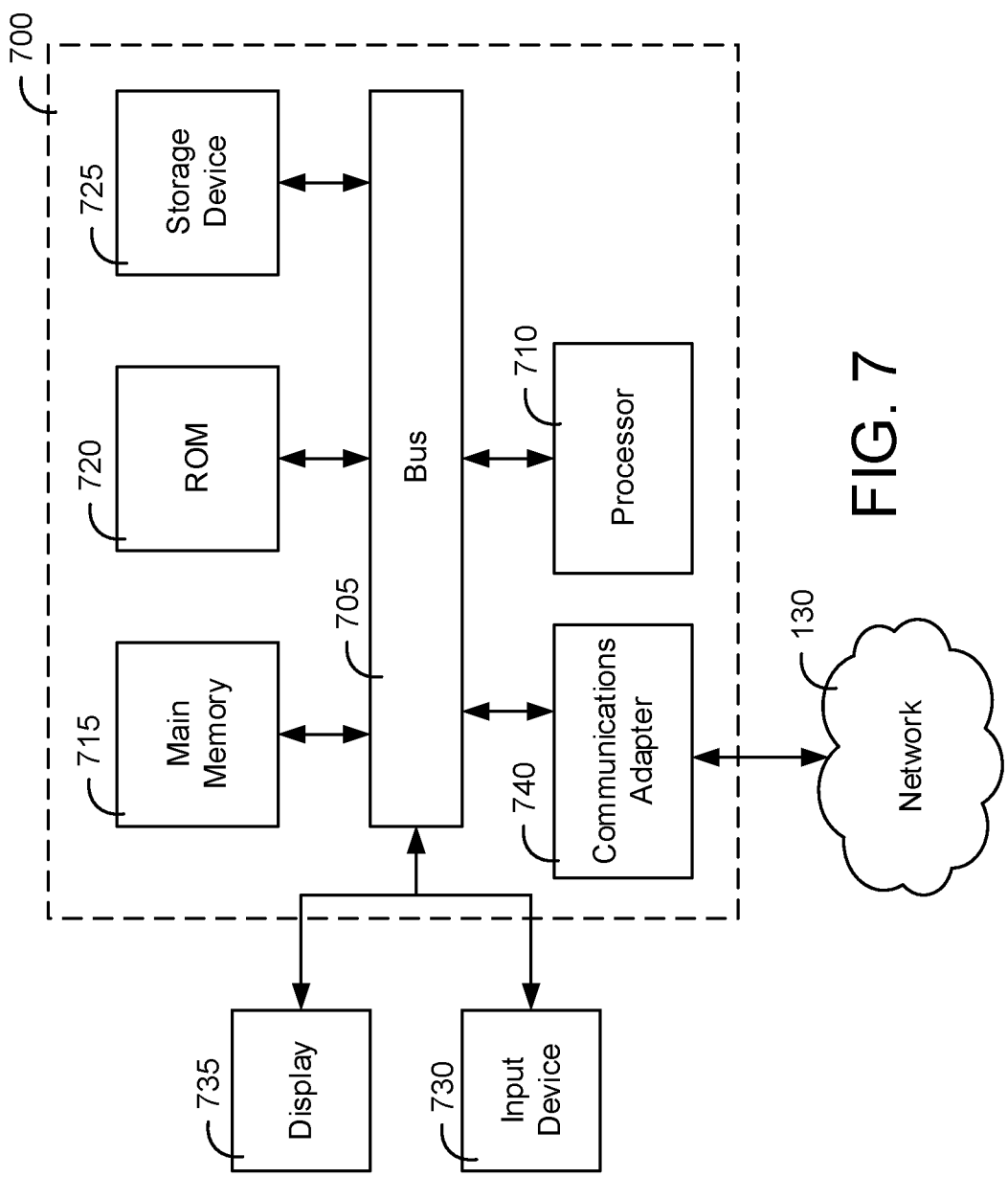
FIG. 7 is a block diagram illustrating an example computing system suitable for use in the various implementations described herein.

Referring now to FIG. 7, a depiction of a computer system 700 is shown. The computer system 700 that can be used, for example, to implement a computing environment 100, lifestyle protection system 110, user devices 140, third-party devices 150, data sources 160, and/or various other example systems described in the present disclosure. The computing system 700 includes a bus 705 or other communication component for communicating information and a processor 710 coupled to the bus 705 for processing information. The computing system 700 also includes main memory 715, such as a random-access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid-state device, magnetic disk, or optical disk, is coupled to the bus 705 for persistently storing information and instructions.

The computing system 700 may be coupled via the bus 705 to a display 735, such as a liquid crystal display, or active-matrix display, for displaying information to a user. An input device 730, such as a keyboard including alphanumeric and other keys, may be coupled to the bus 705 for communicating information, and command selections to the processor 710. In another arrangement, the input device 730 has a touch screen display 735. The input device 730 can include any type of biometric sensor, a cursor control, such as a mouse, a trackball, or cursor direction keys, for communicating direction information and command selections to the processor 710 and for controlling cursor movement on the display 735.

In some implementations, the computing system 700 may include a communications adapter 740, such as a networking adapter. Communications adapter 740 may be coupled to bus 705 and may be configured to enable communications with a computing or communications network 130 and/or other computing systems. In various illustrative implementations, any type of networking configuration may be achieved using communications adapter 740, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

That is, although an example processing system has been described in FIG. 7, implementations of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 7 as singular, stand-alone devices, one of ordinary skill in the art will appreciate that, in some implementations, the computing system 700 may include virtualized systems and/or system resources. For example, in some implementations, the computing system 700 may be a virtual switch, virtual router, virtual host, and virtual server. In various implementations, computing system 700 may share physical storage, hardware, and other resources with other virtual machines. In some 745, virtual resources of the network 130 (e.g., network 130 of FIG. 1) may include cloud computing resources such that a virtual resource may rely on distributed processing across more than one physical processor, distributed memory, etc.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include a general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:
1. A lifestyle protection system comprising:
an embedded application installed on a user device;
a plurality of data channels configured to access activity data;
a network circuit; and
a processing circuit communicably coupled to the plurality of data channels via the network circuit, the processing circuit configured to:
  detect, from the embedded application installed on the user device of a user via a first data channel of the plurality of data channels, activity data based on a transaction by the user or a usage of the user device by the user;
  access the embedded application to collect the activity data;
  responsive to the detection and accessing, generate new capacity units based on the activity data, wherein the new capacity units correspond with a first value;
  determine if a summation of the new capacity units and un-allocated capacity units is above a threshold for a first plan, wherein the un-allocated capacity units are based on previous activity data performed by the user device, and wherein the un-allocated capacity units correspond with a second value below the threshold for the first plan;
  automatically generate the first plan of a plurality of other plans based on the summation of the new capacity units and the un-allocated capacity units, wherein each of the plurality of other plans comprises a plurality of coverages and active periods;
  allocate the summation of the new capacity units and the un-allocated capacity units to the first plan over the plurality of other plans based on an allocation scheme set by the user, wherein the allocation of the summation comprises converting the new capacity units and the un-allocated capacity units to allocated capacity units, and wherein the allocation scheme sets a first coverage amount and an active period based a cumulative value of the allocated capacity units to the first plan;

receive, from the user device, an interaction with at least one slider or button of a graphical user interface (GUI) corresponding with a reallocation of the allocated capacity units; and responsive to the reallocation using the at least one slider or button of the GUI, adjust, in real-time, the coverage or the active period of the first plan, the active period of the first plan comprises a start and end date set by the user, and wherein the adjustment comprises reducing the allocated capacity units by a first amount on the first plan and increasing allocated capacity units by a second amount of a second plan of the plurality of other plans.

2. The lifestyle protection system of claim 1, the processing circuit further configured to:

store the plurality of other plans associated with the allocated capacity unit of the user device, wherein each plan of the plurality of other plans comprises at least one different coverage and a different active period;

update the allocated capacity units based on converting the summation of the new capacity units and the un-allocated capacity units into the allocated capacity units.

3. The lifestyle protection system of claim 2, the processing circuit further configured to:

in response to generating the first plan, aggregate the first plan and the plurality of other plans, wherein aggregating comprises calculating a total coverage based on the allocated capacity units; and wherein the transaction by the user and the usage of the user device is disassociated with any existing plan of the user, the disassociation corresponding with an independence of the any existing plan of the user and the generation of the new capacity units.

4. The lifestyle protection system of claim 3, the processing circuit further configured to:

adjust the at least one different coverage of at least one plan of the plurality of other plans based on the allocation scheme set by the user.

5. The lifestyle protection system of claim 2, the processing circuit further configured to:

generate the graphical user interface (GUI) comprising the first plan and the plurality of other plans and at least one slider or button;

provide, to the user device, the GUI.

6. The lifestyle protection system of claim 2, the processing circuit further configured to:

establish a second data channel of the plurality of data channels between the processing circuit and a third-party application utilizing an application programming interface (API);

generate one or more graphical user interface (GUI) objects for a third-party GUI, wherein the GUI objects comprise at least one slider or button;

integrate the GUI objects into the third-party GUI based on executing API calls with the API;

receive, via the API, an interaction with at least one plan of the plurality of other plans; and update the at least one different coverage or the different active period of the at least one plan of the plurality of other plans.

7. The lifestyle protection system of claim 1, the processing circuit further configured to:

store at least one preference of the user device; and select a type of plan based on the at least one preference, wherein generating the plan is further based on the type of plan.

8. The lifestyle protection system of claim 1, wherein the activity data is detected based on a user action, and wherein the user action is the transaction associated with the user or the usage of the user device.

9. The lifestyle protection system of claim 8, wherein the new capacity units are a digital asset or token issued by the processing circuit, and wherein the new capacity units are a value based on a percentage of the transaction or an amount of the transaction, and wherein the value corresponds to an exchange rate of a fiat currency or other digital currencies.

10. The lifestyle protection system of claim 1, the processing circuit further configured to:

establish a third data channel of the plurality of data channels between the processing circuit and the user device utilizing an application programming interface (API); and monitor, in real-time, the third data channel comprising executing API calls with the API, wherein the API calls return environmental data.

11. The lifestyle protection system of claim 1, the processing circuit further configured to:

establish a third data channel of the plurality of data channels between the processing circuit and an IoT device utilizing an application programming interface (API), wherein the IoT device is associated with the user; and monitor, in real-time, the third data channel comprising executing API calls with the API, wherein the API calls return environmental data.

12. The lifestyle protection system of claim 11, the processing circuit further configured to:

determine an event satisfied at least one condition of the first plan based on the environmental data;

in response to determining the event satisfied at least one condition of the first plan, automatically generate a claim for the first plan based on the first coverage amount and the event;

automatically process the claim based on the environmental data and the event; and transmit, to the user device, the processed claim.

13. The lifestyle protection system of claim 1, the processing circuit further configured to:

detect, from the user device, additional activity data;

generate additional capacity units based on the additional activity data;

determine the additional capacity units and the un-allocated capacity units is below the threshold for the first plan; and update the un-allocated capacity units based converting the additional capacity units into the un-allocated capacity units.

14. A computer-implemented method of plan generation, the method comprising:

detecting, by a processing circuit from an embedded application installed on a user device of a user, activity data based on a transaction by the user or a usage of the user device by the user;

accessing, by the processing circuit, the embedded application to collect the activity data;

responsive to the detection and accessing, generating, by the processing circuit, new capacity units based on the activity data, wherein the new capacity units corresponds with a first value;

determining, by the processing circuit, a summation of the new capacity units and un-allocated capacity units is above a threshold for a first plan, wherein the un-allocated capacity units are based on previous activity data performed by the user device, and wherein the un-allocated capacity units corresponds with a second value below the threshold for the first plan;

automatically generating, by the processing circuit, the first plan of a plurality of other plans based on the summation of the new capacity units and the un-allocated capacity units, wherein each of the plurality of other plans comprises a plurality of coverages and active periods;

allocating, by the processing circuit, the summation of the new capacity units and the un-allocated capacity units to the first plan over the plurality of other plans based on an allocation scheme set by the user, wherein the allocation of the summation comprises converting the new capacity units and the un-allocated capacity units to allocated capacity units, and wherein the allocation scheme sets a first coverage amount and an active period based a cumulative value of the allocated capacity units to the first plan;

receiving, by the processing circuit from the user device, an interaction with at least one slider or button of a graphical user interface (GUI) corresponding with a reallocation of the allocated capacity units; and responsive to the reallocation using the at least one slider or button of the GUI, adjusting, by the processing circuit in real-time, the coverage or the active period of the first plan, the active period of the first plan comprises a start and end date set by the user, and wherein the adjustment comprises reducing the allocated capacity units by a first amount on the first plan and increasing allocated capacity units by a second amount of a second plan of the plurality of other plans.

15. The computer-implemented method of claim 14, further comprising:
storing, by the processing circuit, the plurality of other plans associated with the allocated capacity unit of the user device, wherein each plan of the plurality of other plans comprises at least one different coverage and a different active period;
updating, by the processing circuit, allocated capacity units based on converting the summation of the new capacity units and the un-allocated capacity units into the allocated capacity units.

16. The computer-implemented method of claim 15, further comprising:
in response to generating the first plan, aggregating, by the processing circuit, the first plan and the plurality of other plans, wherein aggregating comprises calculating a total coverage based on the allocated capacity units.

17. The computer-implemented method of claim 16, wherein aggregating further comprises:
adjusting, by the processing circuit, the at least one different coverage of at least one plan of the plurality of other plans based on the allocation scheme set by the user.

18. The computer-implemented method of claim 15, further comprising:
generating, by the processing circuit, a graphical user interface (GUI) comprising the first plan and the plurality of other plans and at least one slider or button;
providing, by the processing circuit to the user device, the GUI.

19. The computer-implemented method of claim 15, further comprising:

establishing, by the processing circuit, a connection between the processing circuit and a third-party application utilizing an application programming interface (API);

generating, by the processing circuit, one or more graphical user interface (GUI) objects for a third-party GUI, wherein the GUI objects comprise at least one slider or button;

integrating, by the processing circuit, the GUI objects into the third-party GUI based on executing API calls with the API;

receiving, by the processing circuit via the API, an interaction with at least one plan of the plurality of plans; and updating, by the processing circuit, the at least one different coverage or the active different period of the at least one plan of the plurality of other plans.

20. The computer-implemented method of claim 14, further comprising:
storing, by the processing circuit, at least one preference of the user device; and
selecting, by the processing circuit, a type of plan based on the at least one preference, wherein generating the plan is further based on the type of plan.

21. The computer-implemented method of claim 14, wherein the activity data is detected based on a user action, and wherein the user action is the transaction associated with the user or the usage of the user device.

22. The computer-implemented method of claim 21, wherein the new capacity units are a digital asset or token issued by the processing circuit, and wherein the new capacity units are a value based on a percentage of the transaction or an amount of the transaction, and wherein the value corresponds to an exchange rate of a fiat currency or other digital currencies.

23. The computer-implemented method of claim 14, further comprising:
establishing, by the processing circuit, a data channel between the processing circuit and the user device utilizing an application programming interface (API); and
monitoring, by the processing circuit in real-time, the data channel comprising executing API calls with the API, wherein the API calls return environmental data.

24. The computer-implemented method of claim 14, further comprising:
establishing, by the processing circuit, a data channel between the processing circuit and an IoT device utilizing an application programming interface (API), wherein the IoT device is associated with the user; and
monitoring, by the processing circuit in real-time, the data channel comprising executing API calls with the API, wherein the API calls return environmental data.

25. The computer-implemented method of claim 24, further comprising:
determining, by the processing circuit, an event satisfied at least one condition of the first plan based on the environmental data;
in response to determining the event satisfied at least one condition of the first plan, automatically generating, by the processing circuit, a claim for the first plan based on the first coverage amount and the event;
automatically processing, by the processing circuit, the claim based on the environmental data and the event; and
transmitting, by the processing circuit to the user device, the processed claim.

26. The computer-implemented method of claim 14, further comprising:
- detecting, by the processing circuit from the user device, additional activity data;
- generating, by the processing circuit, additional capacity units based on the additional activity data;
- determining, by the processing circuit, the additional capacity units and the un-allocated capacity units is below the threshold for the first plan; and
- updating, by the processing circuit, the un-allocated capacity units based converting the additional capacity units into the un-allocated capacity units.

27. A computer-implemented method of claim 14, wherein the transaction by the user and the usage of the user device is disassociated with any existing plan of the user, the disassociation corresponding with an independence of the any existing plan of the user and the generation of the new capacity units.

28. A lifestyle protection system comprising:
- an embedded application installed on a user device;
- a plurality of data channels configured to access activity data;
- a network circuit; and
- a processing circuit communicably coupled to the plurality of data channels via the network circuit, the processing circuit configured to:
  - detect, from the embedded application installed on the user device of a user via a first data channel of the plurality of data channels, activity data based on a transaction by the user or a usage of the user device by the user;
  - access the embedded application to collect the activity data;
  - responsive to the detection and accessing, automatically generate additional capacity units based on the activity data, wherein the new capacity units correspond with a first value;
  - allocate a first portion of the additional capacity units to a first plan over a plurality of other plans based on a first allocation scheme set by the user, wherein the first plan includes a first coverage based on a first total amount of capacity units including the first portion of the additional capacity, and wherein each of the plurality of other plans comprises a plurality of coverages and active periods, and wherein the allocation of the first portion comprises converting the first portion of the additional capacity units to allocated capacity units, and wherein the first allocation scheme sets a first active period based a cumulative value of the allocated capacity units to the first plan;
  - allocate a second portion of the additional capacity units to a second plan over a plurality of other plans based on a second allocation scheme set by the user, wherein the second plan includes a second coverage based on a second total amount of capacity units including the second portion of the additional capacity, and wherein the allocation of the second portion comprises converting the second portion of the additional capacity units to the allocated capacity units, and wherein the second allocation scheme sets a second active period based a second cumulative value of the allocated capacity units to the second plan;
  - receive, from the user device, an interaction with at least one slider or button of a graphical user interface (GUI) corresponding with a reallocation of the allocated capacity units;
  - responsive to the reallocation using the at least one slider or button of the GUI, adjust, in real-time, the coverage or the active period of the first plan, the active period of the first plan comprises a start and end date set by the user, and wherein the adjustment comprises reducing the allocated capacity units by a first amount on the first plan and increasing allocated capacity units by a second amount of a second plan of the plurality of other plans;
  - establish a second data channel of the plurality of data channels between the processing circuit and the user device utilizing an application programming interface (API);
  - monitor, in real-time, the second data channel comprising executing API calls with the API, wherein the API calls return environmental data; and
  - update, in real-time, the first coverage of the first plan or the second coverage of the second plan based on the environmental data.

* * * * *